United States Patent
Merkel

(10) Patent No.: US 11,535,563 B2
(45) Date of Patent: Dec. 27, 2022

(54) METHODS OF MAKING CORDIERITE CERAMIC BODIES USING CHLORITE RAW MATERIAL

(71) Applicant: CORNING INCORPORATED, Corning, NY (US)

(72) Inventor: Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/765,691

(22) PCT Filed: Nov. 30, 2018

(86) PCT No.: PCT/US2018/063301
§ 371 (c)(1),
(2) Date: May 20, 2020

(87) PCT Pub. No.: WO2019/108929
PCT Pub. Date: Jun. 6, 2019

(65) Prior Publication Data
US 2020/0299196 A1   Sep. 24, 2020

Related U.S. Application Data

(60) Provisional application No. 62/592,997, filed on Nov. 30, 2017.

(51) Int. Cl.
*C04B 35/195* (2006.01)
*C04B 35/64* (2006.01)
(Continued)

(52) U.S. Cl.
CPC ........ *C04B 35/195* (2013.01); *B01D 46/2418* (2013.01); *B01D 53/94* (2013.01);
(Continued)

(58) Field of Classification Search
CPC .............. C04B 35/195; C04B 38/0006; B01D 46/2418
See application file for complete search history.

(56) References Cited

U.S. PATENT DOCUMENTS

| 3,499,787 A | 3/1970 | Inoue et al. |
| 4,063,955 A | 12/1977 | Fritsch, Jr. et al. |
(Continued)

FOREIGN PATENT DOCUMENTS

| CN | 103524123 A | 1/2014 |
| JP | 2010-100442 A | 5/2010 |
(Continued)

OTHER PUBLICATIONS

Guha et al; "Use of Non-Conventional Raw Materials for Making Saggars"; Transactions of the Indian Ceramic Society, 47 [1] 20-21 (1988).
(Continued)

*Primary Examiner* — Karl E Group
(74) *Attorney, Agent, or Firm* — Joseph M. Homa

(57) ABSTRACT

A method of making a porous cordierite ceramic article using chlorite raw material is described herein. The method includes mixing materials to form a cordierite-forming mixture. The cordierite-forming mixture includes a chlorite raw material in an amount of about 5% to about 60% by weight and a platy aluminum silicate raw material in an amount of 0% to about 30% by weight of the total inorganic content of the cordierite-forming mixture. The cordierite-forming mixture is then formed into a green body and fired to form the porous cordierite ceramic article. In some cases, the porous cordierite ceramic article exhibits a low coefficient of thermal expansion (CTE), which provides the article with high thermal shock resistance.

21 Claims, 6 Drawing Sheets

(51) Int. Cl.
    *C04B 38/00*     (2006.01)
    *B01D 46/24*     (2006.01)
    *B01D 53/94*     (2006.01)

(52) U.S. Cl.
    CPC .......... *C04B 35/64* (2013.01); *C04B 38/0006* (2013.01); *B01D 2255/9155* (2013.01); *B01D 2279/30* (2013.01); *C04B 2235/349* (2013.01); *C04B 2235/3463* (2013.01); *C04B 2235/3481* (2013.01); *C04B 2235/9607* (2013.01)

(56) References Cited

U.S. PATENT DOCUMENTS

| | | |
|---|---|---|
| 5,258,150 A | 11/1993 | Merkel et al. |
| 8,389,101 B2 | 3/2013 | Merkel |
| 2009/0220736 A1 | 9/2009 | Merkel |
| 2010/0304082 A1 | 12/2010 | Merkel |

FOREIGN PATENT DOCUMENTS

| | | |
|---|---|---|
| TW | 201345866 A | 11/2013 |
| WO | 2010/138801 A1 | 12/2010 |

OTHER PUBLICATIONS

Hammer, G. (1967) Use of chlorite in low expansion ceramic bodies. J. Aust. Ceram. Soc., 3 (1), 5-9.
International Search Report and Written Opinion of the International Searching Authority; PCT/US2018/063301 dated Feb. 14, 2019, 10 pages; European Patent Office.
Lamar et al; "Reaction and Fired-Property Studies of Cordierite Compositions", J. Am. Ceram. Soc. 37 [12] 602-610 (1954).
Lamar; "Development of Cordierite Bodies With Sierralite, a New Ceramic Material"; J. Am. Ceram. Soc. 32 [2] 65-71 (1949).
P. Grosjean, "Cordierite Ceramics", Whitewares, Interceram, vol. 42, No. 1, 1993, pp. 11-15.
Segnit, E. R., & Holland, A. E. (1971) Formation of cordierite from clinochlore and kaolinite. J. Austral. Ceram. Soc., 7, 43-46.
Shiraki; "Cordierite Bodies With Chlorite"; J. Ceram. Assoc. Jap.. 61 [689] 532-536 (1953).

METHODS OF MAKING CORDIERITE CERAMIC BODIES USING CHLORITE RAW MATERIAL

CROSS-REFERENCE TO RELATED APPLICATIONS

This application is a National Stage application under 35 U.S.C. § 371 of International Application No. PCT/US2018/063301 filed on Nov. 30, 2018 which claims the benefit of priority under 35 U.S.C. § 119 of U.S. Provisional Application No. 62/592,997, filed Nov. 30, 2017, the contents of which are relied upon and incorporated herein by reference in their entireties.

FIELD

The following description relates generally to making cordierite bodies and, more particularly, to making cordierite honeycomb bodies for use in engine exhaust treatment applications.

BACKGROUND

Cordierite honeycomb bodies are used in the motor vehicle industry in engine exhaust treatment applications such as filter and catalytic converter applications. During use in these applications, the cordierite honeycomb bodies will often experience environments with significant temperature gradients. For example, when a vehicle engine starts, the cordierite body experiences a significant temperature gradient between the ambient environment and the hot exhaust from the engine.

SUMMARY

Illustrative embodiments of the present disclosure are directed to a method of making a porous ceramic article comprising cordierite. The method comprises: mixing a plurality of materials to form a cordierite-forming mixture, wherein the cordierite-forming mixture comprises: (i) a chlorite raw material in an amount of about 5% to about 60% by weight of a total inorganic content of the cordierite-forming mixture, (ii) a silica source material, and (iii) an aluminum-containing source material, wherein the aluminum-containing source material comprises a platy aluminum silicate raw material in an amount of 0% to about 30% by weight of the total inorganic content of the cordierite-forming mixture; forming the cordierite-forming mixture into a green body; and firing the green body to form the porous ceramic article comprising cordierite.

In some embodiments, the cordierite-forming mixture comprises the chlorite raw material in an amount of about 5% to about 45% by weight of a total inorganic content of the cordierite-forming mixture.

In some embodiments, the chlorite raw material comprises a clinochlore.

In some embodiments, the aluminum-containing source material comprises an alumina source material.

In some embodiments, the aluminum-containing source material comprises the platy aluminum silicate raw material in an amount of 0% to about 20% by weight of the total inorganic content of the cordierite-forming mixture.

In some embodiments, the cordierite-forming mixture is substantially free of the platy aluminum silicate raw materials.

In some embodiments, the platy aluminum silicate raw material comprises at least one of pyrophyllite, kaolin clay, and ball clay.

In some embodiments, the aluminum-containing source material comprises an $Al_2SiO_5$ raw material in an amount of 0% to about 45% by weight of the total inorganic content of the cordierite-forming mixture.

In some embodiments, the aluminum-containing source material comprises the $Al_2SiO_5$ raw material in an amount of 0% to about 40% by weight of the total inorganic content of the cordierite-forming mixture.

In some embodiments, the cordierite-forming mixture is substantially free of the $Al_2SiO_5$ raw material.

In some embodiments, the aluminum-containing source material comprises a mullite raw material in an amount of 0% to about 35% by weight of the total inorganic content of the cordierite-forming mixture.

In some embodiments, the aluminum-containing source material comprises the mullite raw material in an amount of 0% to about 30% by weight of the total inorganic content of the cordierite-forming mixture.

In some embodiments, the cordierite-forming mixture is substantially free of the mullite raw material.

In some embodiments, the cordierite-forming mixture comprises $Al_2SiO_5$ raw material and mullite raw material together in an amount of 0% to about 45% by weight of the total inorganic content of the cordierite-forming mixture.

In some embodiments, the aluminum-containing source material comprises: (a) an alumina source material in an amount of 0% to about 40% by weight of the total inorganic content of the cordierite-forming mixture; (b) an $Al_2SiO_5$ raw material in an amount of 0% to about 45% by weight of the total inorganic content of the cordierite-forming mixture; and (c) a mullite raw material in an amount of 0% to about 35% by weight of the total inorganic content of the cordierite-forming mixture, wherein the cordierite-forming mixture satisfies the following relationship:

$$W_M(0.477-0.0095D_{50,M})+W_S(0.469-0.019D_{50,S})+W_P(0.721-0.075D_{50,P})+0.055(W_A)(D_{50,A}) \leq 13,$$

wherein $W_M$ is a percentage by weight of mullite raw material, $W_S$ is a percentage by weight of $Al_2SiO_5$ raw material, $W_P$ is a percentage by weight of the platy aluminum silicate raw material, and $W_A$ is a percentage by weight of the alumina source material, $D_{50,M}$ is a median particle diameter of the mullite raw material in microns, $D_{50,S}$ is a median particle diameter of the $Al_2SiO_5$ raw material in microns, $D_{50,P}$ is a median particle diameter of the platy aluminum silicate raw material in microns, and $D_{50,A}$ is a median particle diameter of the alumina source material in microns.

In some embodiments, $W_M(0.477-0.0095D_{50,M})+W_S(0.469-0.019D_{50,S})+W_P(0.721-0.075D_{50,P})+0.055(W_A)(D_{50,A}) \leq 12.6$ In some embodiments, $W_M(0.477-0.0095D_{50,M})+W_S(0.469-0.019D_{50,S})+W_P(0.721-0.075D_{50,P})+0.055(W_A)(D_{50,A}) \leq 12.$ In some embodiments, the cordierite-forming mixture comprises talc in an amount of about 0% to about 45% by weight of the total inorganic content of the cordierite-forming mixture.

In some embodiments, the cordierite-forming mixture is substantially free of talc.

In some embodiments, the porous ceramic article comprises a coefficient of thermal expansion of less than or equal to about $14 \times 10^{-7}$ °$C.^{-1}$ from 25 to 800° C. In some embodiments, In some embodiments, the porous ceramic article comprises a coefficient of thermal expansion of less than or equal to about $12\times10^{-7}$ °C.$^{-1}$ from 25 to 800° C.

In some embodiments, the porous ceramic article comprises a porosity of at least about 35%.

In some embodiments, the porous ceramic article comprises cordierite in an amount greater than about 85% by weight of a total of all crystalline phases within the porous ceramic article.

In some embodiments, the porous ceramic article comprises a sum of spinel, sapphirine, mullite, and corundum in an amount of 0% to about 10% by weight of a total of all crystalline phases within the porous ceramic article.

In some embodiments, the porous ceramic article comprises a sum of spinel, sapphirine, mullite, and corundum in an amount of 0% to about 2% by weight of a total of all crystalline phases within the porous ceramic article.

In some embodiments, the porous ceramic article comprises cristobalite in an amount of 0% to about 5% by weight of a total of all crystalline phases within the porous ceramic article.

In some embodiments, the porous ceramic article is substantially free of cristobalite.

In some embodiments, the porous ceramic article comprises a composition that satisfies the following relationships:

(wt % MgO+wt % Al$_2$O$_3$+wt % SiO$_2$)≥90,

10≤100[wt % MgO/(wt % MgO+wt % Al$_2$O$_3$+wt % SiO$_2$)]≤16,

31≤100[wt % Al$_2$O$_3$/(wt % MgO+wt % Al$_2$O$_3$+wt % SiO$_2$)]≤40, and

47≤100[wt % SiO$_2$/(wt % MgO+wt % Al$_2$O$_3$+wt % SiO$_2$)]≤56.

In some embodiments, the composition of the porous ceramic article further satisfies the following relationship:

$A+AE+RE<0.5$, where A is a sum of weight percentages of alkali metal oxides, AE is a sum of weight percentages of alkaline earth metal oxides excluding MgO, and RE is a sum of weight percentages of rare earth metal oxides.

In some embodiments, forming the cordierite-forming mixture to form the green body comprises extruding the cordierite-forming mixture to form a green body that comprises a network of walls that extend in an axial direction about a longitudinal axis from an inlet end to an outlet end of the green body.

In some embodiments, the porous ceramic article comprises an $E_{800°\ C.}/E_{25°\ C.}$ ratio of at least about 1.00.

In some embodiments, the porous ceramic article comprises an $E_{25°\ C.}/E°_{25°\ C.}$ ratio of less than or equal to about 0.92.

Illustrative embodiments are directed to another method of making a porous ceramic article comprising cordierite. The method comprises: mixing a plurality of materials to form a cordierite-forming mixture, wherein the cordierite-forming mixture comprises: (i) a chlorite raw material in an amount of about 5% to about 60% by weight of a total inorganic content of the cordierite-forming mixture, (ii) a silica source material, (iii) an alumina source material in an amount of 0% to about 40% by weight of the total inorganic content of the cordierite-forming mixture; (iv) a platy aluminum silicate raw material in an amount of 0% to about 30% by weight of the total inorganic content of the cordierite-forming mixture; (v) an Al$_2$SiO$_5$ raw material in an amount of 0% to about 45% by weight of the total inorganic content of the cordierite-forming mixture; (vi) a mullite raw material in an amount of 0% to about 35% by weight of the total inorganic content of the cordierite-forming mixture, wherein the cordierite-forming mixture satisfies the following relationship:

$W_M(0.477-0.0095D_{50,M})+W_S(0.469-0.019D_{50,S})+W_P(0.721-0.075D_{50,P})+0.055(W_A)(D_{50,A})\leq13$, wherein $W_M$ is a percentage by weight of mullite raw material, $W_S$ is a percentage by weight of Al$_2$SiO$_5$ raw material, $W_P$ is a percentage by weight of the platy aluminum silicate raw material, and $W_A$ is a percentage by weight of the alumina source material, $D_{50,M}$ is a median particle diameter of the mullite raw material in microns, $D_{50,S}$ is a median particle diameter of the Al$_2$SiO$_5$ raw material in microns, $D_{50,P}$ is a median particle diameter of the platy aluminum silicate raw material in microns, and $D_{50,A}$ is a median particle diameter of the alumina source material in microns; forming the cordierite-forming mixture into a green body; and firing the green body to form the porous ceramic article comprising cordierite.

In some embodiments, $W_M(0.477-0.0095D_{50,M})+W_S(0.469-0.019D_{50,S})+W_P(0.721-0.075D_{50,P})+0.055(W_A)(D_{50,A})\leq12.6$.

In some embodiments, $W_M(0.477-0.0095D_{50,M})+W_S(0.469-0.019D_{50,S})+W_P(0.721-0.075D_{50,P})+0.055(W_A)(D_{50,A})\leq12$.

In some embodiments, the porous ceramic article comprises a coefficient of thermal expansion of less than or equal to about $14\times10^{-7}$ °C.$^{-1}$ from 25 to 800° C.

Illustrative embodiments of the present disclosure are also directed to a cordierite-forming mixture comprising: (i) chlorite raw material in an amount of about 5% to about 60% by weight of a total inorganic content of the cordierite-forming mixture; (ii) an alumina source material; (iii) a silica source material; (iv) a platy aluminum silicate raw material in an amount of about 0% to about 30% by weight of the total inorganic content of the cordierite-forming mixture; (v) an Al$_2$SiO$_5$ raw material in an amount of 0% to about 45% by weight of the total inorganic content of the cordierite-forming mixture; and (vi) a mullite raw material in an amount of 0% to about 35% by weight of the total inorganic content of the cordierite-forming mixture; wherein the cordierite-forming mixture satisfies the following relationship:

$W_M(0.477-0.0095D_{50,M})+W_S(0.469-0.019D_{50,S})+W_P(0.721-0.075D_{50,P})+0.055(W_A)(D_{50,A})\leq13$, wherein $W_M$ is a percentage by weight of mullite raw material, $W_S$ is a percentage by weight of Al$_2$SiO$_5$ raw material, $W_P$ is a percentage by weight of the platy aluminum silicate raw material, and $W_A$ is a percentage by weight of the alumina source material, $D_{50,M}$ is a median particle diameter of the mullite raw material in microns, $D_{50,S}$ is a median particle diameter of the Al$_2$SiO$_5$ raw material in microns, $D_{50,P}$ is a median particle diameter of the platy aluminum silicate raw material in microns, and $D_{50,A}$ is a median particle diameter of the alumina source material in microns.

In some embodiments, the cordierite-forming mixture comprises the chlorite raw material in an amount of about 5% to about 45% by weight of a total inorganic content of the cordierite-forming mixture.

BRIEF DESCRIPTION OF THE DRAWINGS

The above and other features, aspects and advantages of the present disclosure are better understood when the following detailed description of the disclosure is read with reference to the accompanying drawings, in which.

DETAILED DESCRIPTION

Illustrative embodiments of the present disclosure are directed to a method of making a porous cordierite ceramic article using chlorite raw material. The method comprises mixing a plurality of materials to form a cordierite-forming mixture. The cordierite-forming mixture comprises, among other things, a chlorite raw material in an amount of about 5% to about 60% by weight and a platy aluminum silicate raw material in an amount of 0% to about 30% by weight of the total inorganic content of the cordierite-forming mixture. The cordierite-forming mixture is then formed into a green body and fired to form the porous ceramic article comprising cordierite. In various embodiments, the porous cordierite ceramic article exhibits a low coefficient of thermal expansion (CTE), which provides the article with high thermal shock resistance. Details of various embodiments are discussed below.

Method of Making a Porous Ceramic Article Comprising Cordierite

Figure 1:
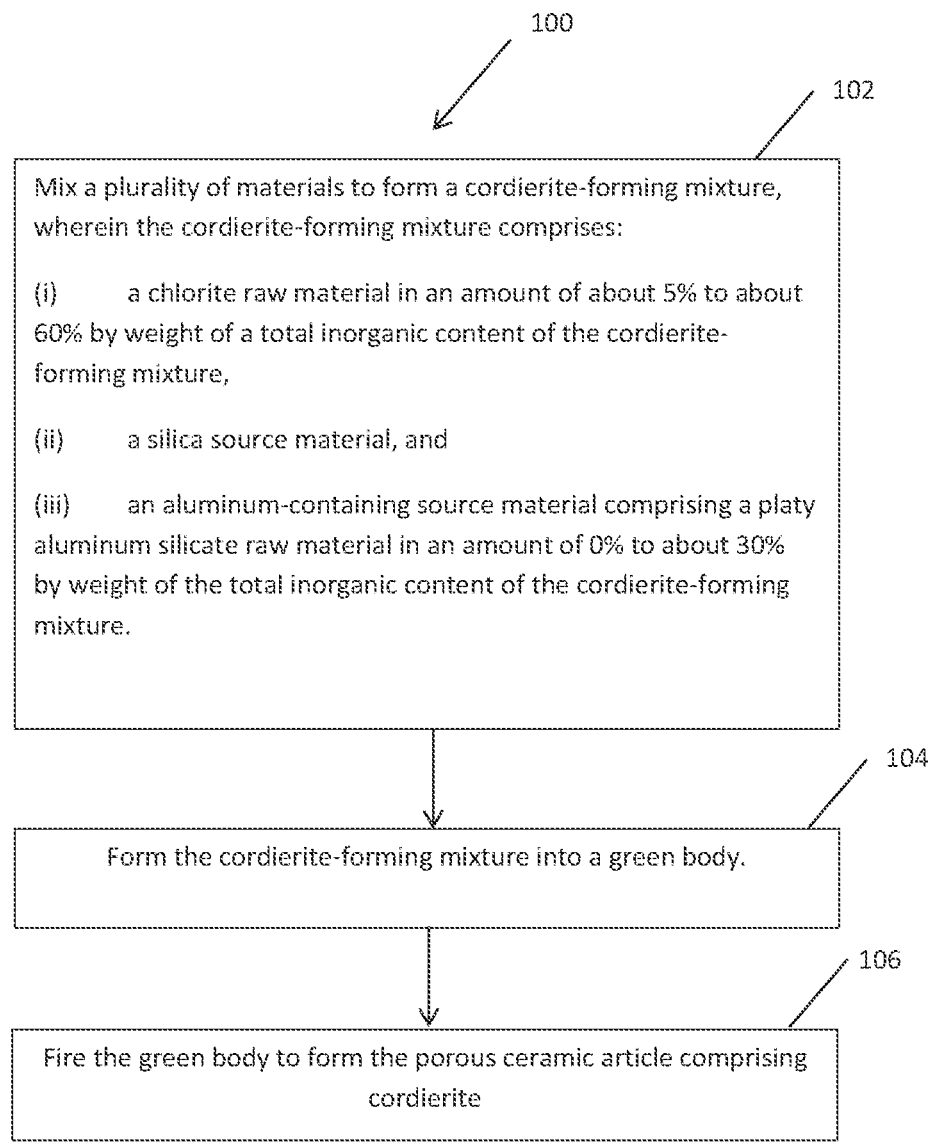
FIG. 1 schematically depicts a method of making a porous cordierite ceramic article in accordance with one embodiment of the present disclosure.
Figure 3:
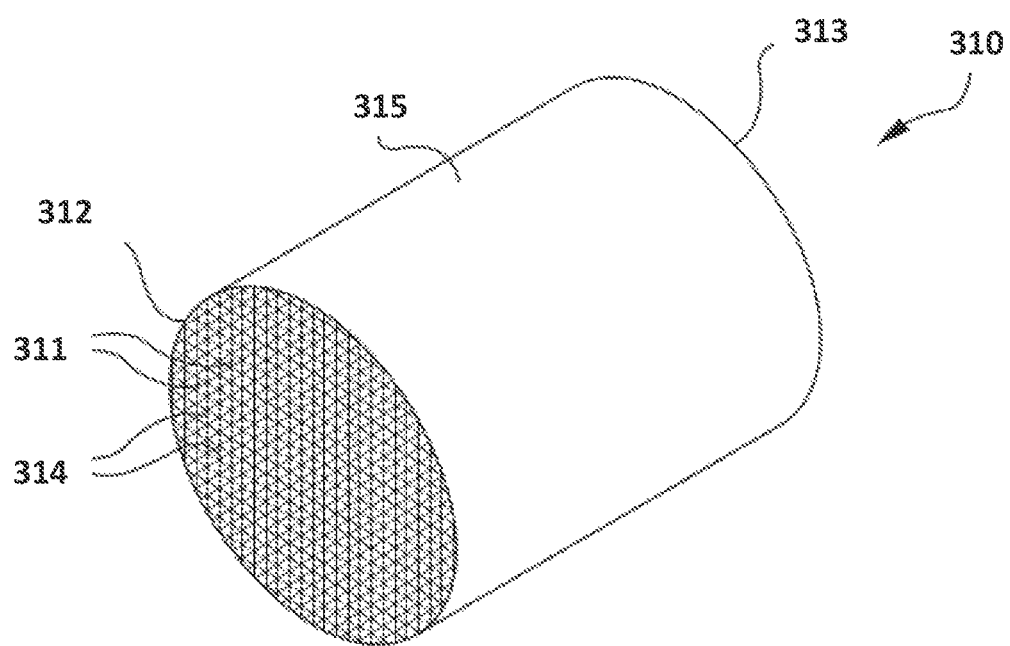
FIG. 3 is an isometric view of a porous ceramic article in accordance with one embodiment of the present disclosure.
Figure 4:
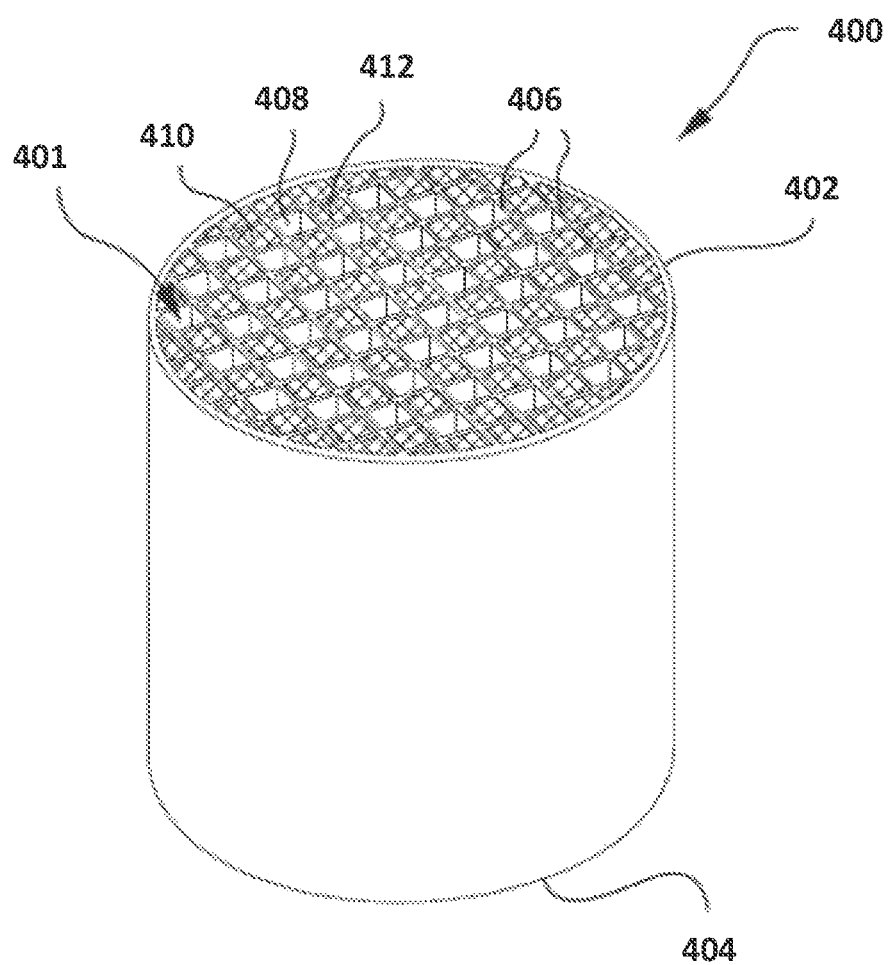
FIG. 4 is an isometric view of a porous ceramic article in accordance with another embodiment of the present disclosure.

FIG. 1 schematically depicts a method of making a porous ceramic article comprising cordierite, such as the ones shown in FIGS. 3 and 4, using a chlorite raw material. At process 102, the method begins by mixing materials to form a cordierite-forming mixture. The raw materials comprise (i) a chlorite raw material, (ii) a silica source material, and (iii) an aluminum-containing source material.

A chlorite raw material is a magnesium-containing compound from the chlorite mineral group. An example of a chlorite raw material is a magnesium-containing chlorite material, such as a clinochlore mineral. In some embodiments, the chlorite minerals disclosed herein have a generalized chemical composition of $(X,Y)_{4-6}(Si,Al)_4O_{10}(OH,O)_8$, where "X" and "Y" represent ions, such as: $Fe^{+2}$, $Fe^{+3}$, $Mg^{+2}$, $Mn^{+2}$, $Ni^{+2}$, $Zn^{+2}$, $Al^{+3}$, $Li^{+1}$, or $Ti^{+4}$. One approximate composition for chlorite, as the mineral clinochlore, is $Mg_5Si_3Al_2O_{10}(OH)_8$. In some embodiments, the chlorite raw material is predominantly a clinochlore mineral (e.g., at least about 70%, 80%, or 90% by weight of the chlorite raw material is a clinochlore mineral).

The cordierite-forming mixture preferably comprises a chlorite raw material in an amount of about 5% to about 60% by weight of total inorganic content of the cordierite-forming mixture. In further embodiments, the cordierite-forming mixture comprises the chlorite raw material an amount of about 5% to about 45% by weight, in an amount of about 10% to about 45% by weight, in an amount of about 20% to about 45% by weight, in an amount of about 30% to about 45% by weight, or in an amount of about 35% to about 40% by weight of total inorganic content of the cordierite-forming mixture. Also, in various embodiments, the cordierite-forming mixture preferably comprises the chlorite raw material in an amount of at least about 5% by weight of a total inorganic content of the cordierite-forming mixture, such as at least about 10% by weight, at least about 15% by weight, at least about 20% by weight, at least about 30% by weight, or at least about 35% by weight of the total inorganic content of the cordierite-forming mixture.

In some embodiments, the chlorite raw material comprises $Fe_2O_3$ in an amount of not more than about 2% by weight of the chlorite raw material. In further embodiments, the chlorite raw material comprises $Fe_2O_3$ in an amount of not more than about 1.5% by weight, in an amount of not more than about 1% by weight, in an amount of not more than about 0.5% by weight, or in an amount of not more than about 0.3% by weight of the chlorite raw material. In some embodiments, the chlorite raw material is substantially free of $Fe_2O_3$.

As used herein, the phrase "substantially free" with respect to a component of a cordierite-forming mixture means that the component is not actively or intentionally added to the cordierite-forming mixture during initial mixing, but may be present as an impurity in an amount less than about 0.01% by weight of the cordierite-forming mixture.

As used herein, the phrase "substantially free" with respect to a component or phase of a ceramic article means that the component or phase may be present as an impurity in an amount less than about 0.01% by weight of the ceramic article.

In some embodiments, the chlorite raw material comprises CaO in an amount of not more than about 1% by weight of the chlorite raw material. In further embodiments, the chlorite raw material comprises CaO in an amount of not more than about 0.5% by weight, in an amount of not more than about 0.25% by weight, or in an amount of not more than about 0.15% by weight of the chlorite raw material. In some embodiments, the chlorite raw material is substantially free of CaO.

In some embodiments, the chlorite raw material comprises a sum of $Na_2O$ and $K_2O$ in an amount of not more than about 0.5% by weight of the chlorite raw material. In further embodiments, the chlorite raw material comprises a sum of $Na_2O$ and $K_2O$ in an amount of not more than about 0.25% by weight, in an amount of not more than about 0.10% by weight, or in an amount of not more than about 0.05% by weight of the chlorite raw material. In some embodiments, the chlorite raw material is substantially free of $Na_2O$ and/or $K_2O$.

The cordierite-forming mixture preferably comprises a silica source material. A silica source material is silica itself and/or any compound that yields at least 85% by weight (e.g., at least 98% by weight) of a free silica phase when heated. Silica source material comprises, but is not limited to, (i) non-crystalline silica, such as fused silica and sol-gel silica; (ii) crystalline silica, such as zeolite, quartz, and cristobalite; (iii) silicone resin; and (iv) diatomaceous silica. Silica source material also comprises one or more compounds that form free silica when heated, such as, for example, silicic acid and silicone organometallic compounds. In some embodiments, the median particle diameter $(D_{50})$ of the silica source material is less than about 25.0 microns, and in further embodiments, may be less than about 20.0 microns, less than about 15.0 microns, less than about 10.0 microns, or less than about 5.0 microns. The median particle diameter ($D_{50}$) is the particle diameter value at the 50th percentile of the cumulative particle size distribution as determined by a laser diffraction particle size analyzer. The median particle diameter ($D_{50}$) is the particle diameter at which 50% by volume of the particles are of a finer diameter and 50% by volume of the particles are of a coarser diameter.

The cordierite-forming mixture preferably comprises an aluminum-containing source material. The aluminum-containing source material may comprise an alumina source material and/or an aluminosilicate raw material. An alumina source material is alumina itself and/or any compound that yields at least 98% by weight of a free alumina phase when heated. Alumina source material comprises, but is not limited to, corundum, aluminum hydroxide (e.g., gibbsite, bayerite, and aluminum trihydrate), and aluminum oxide hydroxide (e.g., boehmite and diaspore).

In some embodiments, the cordierite-forming mixture comprises the alumina source material in an amount of not more than about 45% by weight of the total inorganic content of the cordierite-forming mixture, such as in an amount of not more than about 40%, in an amount of not more than about 30% by weight, in an amount of not more than about 15% by weight, or in an amount of not more than about 5% by weight of the total inorganic content of the cordierite-forming mixture. In some embodiments, the cordierite-forming mixture is substantially free of the alumina source material. In some embodiments, the cordierite-forming mixture comprises the alumina source material in an amount of at least 5% by weight of the total inorganic content of the cordierite-forming mixture, such as at least 10% by weight, at least 15% by weight, or at least 20% by weight of the total inorganic content of the cordierite-forming mixture.

An alumina source material of a fine particle size is beneficial to reducing CTE of the porous ceramic article, as compared to a coarser alumina source material, because finer alumina source material creates a ceramic microstructure that promotes a greater amount of microcracking and also facilitates reaction of raw materials to produce a higher percentage of cordierite in the porous ceramic article. Also, the use of a finer alumina source material provides for a porous ceramic article with a low CTE, even when the cordierite-forming mixture comprises a greater amount of aluminosilicate raw material and/or an aluminosilicate raw material of a slightly finer particle size, as represented in the relationship of Equation 2 below. To this end, in some embodiments, the median particle diameter ($D_{50}$) of the alumina source material is less than about 10.0 microns, and in further embodiments, is less than about 7.0 microns, less than about 5.0 microns, less than about 3.0 microns, or less than about 1.0 microns.

The aluminum-containing source material used in the cordierite-forming mixture may comprise an aluminosilicate raw material. An aluminosilicate raw material is a compound that (i) comprises 20 to 75% by weight of SiO2 and 25 to 80% by weight $Al_2O_3$ (after excluding fugitive components, such as $H_2O$, $CO_2$, and $SO_2$) and (ii) comprises at least 90% by weight of $SiO_2$ and $Al_2O_3$ (after excluding fugitive components), and preferably comprises at least 95%, 97%, 98%, or 99% by weight of $SiO_2$ and $Al_2O_3$. Aluminosilicate raw material comprises (i) platy aluminum silicate raw materials, (ii) $Al_2SiO_5$ raw materials, and/or (iii) mullite raw materials.

In some embodiments, the aluminum-containing source material used in the cordierite-forming mixture may comprise a platy aluminum silicate raw material. As used herein, the term "platy aluminum silicate raw material" refers to any material that comprises aluminum silicate and that has a platy particle morphology. Examples of platy aluminum silicate raw materials comprise pyrophyllite and clays, such as kaolin clay and ball clay. The platy aluminum silicate raw material can be used within a cordierite-forming mixture in hydrous form, calcined form, or in combinations thereof. The cordierite-forming mixture optionally comprises the platy aluminum silicate raw material in an amount of not more than about 30% by weight of the total inorganic content of the cordierite-forming mixture. In further embodiments, the cordierite-forming mixture comprises the platy aluminum silicate raw material in an amount of not more than about 20% by weight, in an amount of not more than about 10% by weight, in an amount of not more than about 5% by weight, or in an amount of not more than about 2% by weight of the total inorganic content of the cordierite-forming mixture. In some embodiments, the cordierite-forming mixture is substantially free of the platy aluminum silicate raw material.

The cordierite-forming mixture may comprise other aluminosilicate raw materials. For example, the cordierite-forming mixture may comprise $Al_2SiO_5$ raw material and/or mullite raw material.

An $Al_2SiO_5$ raw material comprises one or more of the minerals kyanite, andalusite, sillimanite, and their calcined products. In some embodiments, the cordierite-forming mixture comprises an $Al_2SiO_5$ raw material in an amount of not more than about 45% by weight of the total inorganic content of the cordierite-forming mixture, such as in an amount of not more than about 40% by weight, in an amount of not more than about 30% by weight, in an amount of not more than about 15% by weight, or in an amount of not more than about 5% by weight of the total inorganic content of the cordierite-forming mixture. In some embodiments, the cordierite-forming mixture is substantially free of the $Al_2SiO_5$ raw material.

A mullite raw material is (i) $Al_6Si_2O_{13}$ and its crystalline solutions, such as, but not restricted to, those mullite compositions lying between the limits of about $Al_6Si_2O_{13}$ and about $Al_8Si_2O_{18}$, and/or (ii) "fused mullite" powders that may comprise mixtures of a mullite phase with one or more of (a) corundum, (b) cristobalite, and (c) a silica or aluminosilicate glass phase. In some embodiments, the cordierite-forming mixture comprises a mullite raw material in an amount of not more than about 35% by weight of the total inorganic content of the cordierite-forming mixture, such as in an amount of not more than about 30%, in an amount of not more than about 15% by weight, in an amount of not more than about 10% by weight, or in an amount of not more than about 5% by weight of the total inorganic content of the cordierite-forming mixture. In some embodiments, the cordierite-forming mixture is substantially free of the mullite raw material.

In some embodiments, the cordierite-forming mixture comprises the $Al_2SiO_5$ raw material and the mullite raw material together in an amount of not more than about 45% by weight of the total inorganic content of the cordierite-forming mixture. In further embodiments, the cordierite-forming mixture comprises the $Al_2SiO_5$ raw material and the mullite raw material together in an amount of not more than about 35% by weight, not more than about 30% by weight, not more than about 15% by weight, not more than about 10% by weight, or not more than about 5% by weight of the total inorganic content of the cordierite-forming mixture. In some embodiments, the cordierite-forming mixture is substantially free of $Al_2SiO_5$ raw material and/or mullite raw material.

In some embodiments, the cordierite-forming mixture satisfies one or both of the following relationships:

$$W_M \leq 35, W_S \geq 45, \text{ and } W_P \leq 30, \text{ and/or} \quad \text{Eq. 1}$$

$$C = W_M(0.477 - 0.0095 D_{50,M}) + W_S(0.469 - 0.019 D_{50,S}) + W_P(0.721 - 0.075 D_{60,P}) + 0.055(W_A)(D_{50,A}) \leq 13, \quad \text{Eq. 2}$$

where $W_M$ is a percentage by weight of mullite raw material, $W_S$ is a percentage by weight of $Al_2SiO_5$ raw material, $W_P$ is a percentage by weight of the platy aluminum silicate raw material, and $W_A$ is a percentage by weight of the alumina source material, $D_{50,M}$ is a median particle diameter of the mullite raw material in microns, $D_{50,S}$ is a median particle diameter of the $Al_2SiO_5$ raw material in microns, $D_{50,P}$ is a median particle diameter of the platy aluminum silicate raw material in microns, and $D_{50,A}$ is a median particle diameter of the alumina source material in microns (all median particle diameters measured using a laser diffraction particle size analyzer). The percentages by weight of the raw materials are based upon a sum of all the inorganic content in the cordierite-forming mixture equal to 100%.

Figure 2:
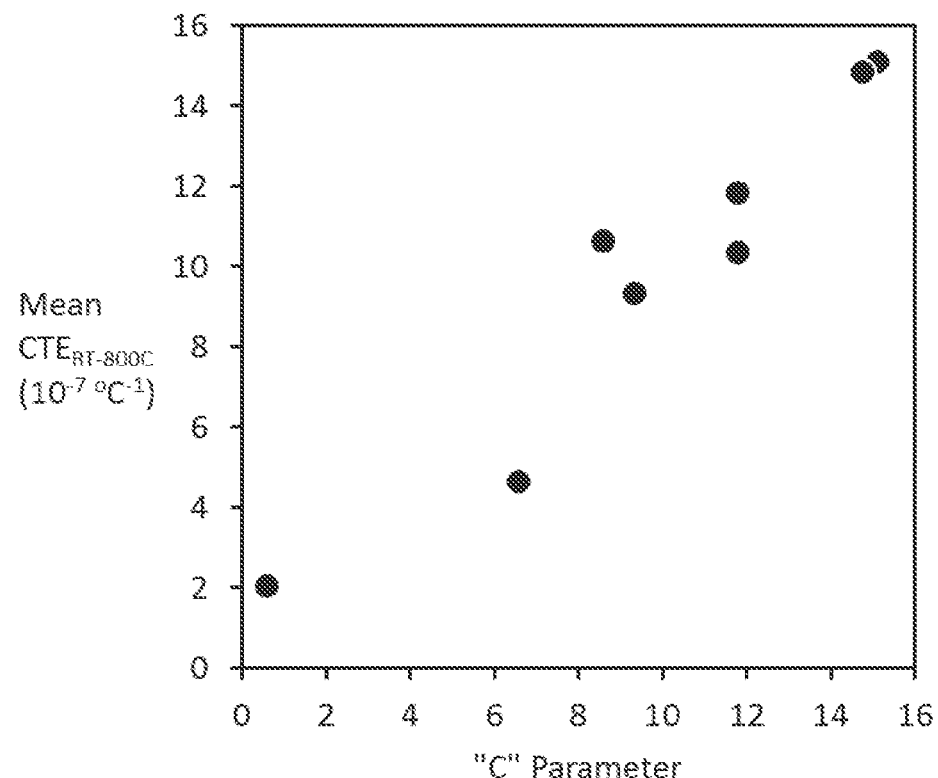
FIG. 2 shows a plot of CTE versus C parameter for Examples 1-9 in accordance with some embodiments of the present disclosure.

In accordance with various embodiments, the value of the C parameter in Equation 2 is less than or equal to 13. In further embodiments, the value of the C parameter in Equation 2 is less than or equal to 12.6, less than or equal to 12, less than or equal to 11, less than or equal to 10, less than or equal to 8, or less than or equal to 4. A lower value for the C parameter is associated with lower values for the coefficient of thermal expansion of the porous ceramic article. FIG. 2 shows a plot of CTE versus the C parameter for Examples 1-9 in Tables 4 and 5. The plot shows that lower values for the C parameter are associated with lower values for the coefficient of thermal expansion in the porous ceramic article.

In some embodiments, the cordierite-forming mixture may comprise more than one source of a mullite raw material, more than one source of an $Al_2SiO_5$ raw material, more than one source of a platy aluminum silicate raw material, and/or more than one source of an alumina source material. In such cases, the values of $D_{50,M}$, $D_{50,S}$, $D_{50,P}$, and $D_{50,A}$ used in Equation 2 may represent a weighted average of the median particle diameters of the constituent raw materials comprising each respective raw material group, as shown below:

$$D_{50,M} = (1/W_M) \Sigma\{(W_{M,i})(D_{50,M,i})\} \quad \text{Eq. 3}$$

$$D_{50,S} = (1/W_S) \Sigma\{(W_{S,i})(D_{50,S,i})\} \quad \text{Eq. 4}$$

$$D_{50,P} = (1/W_P) \Sigma\{(W_{P,i})(D_{50,P,i})\} \quad \text{Eq. 5}$$

$$D_{50,A} = (1/W_A) \Sigma\{(W_{A,i})(D_{50,A,i})\} \quad \text{Eq. 6}$$

where the subscript "i" denotes each individual raw material within the respective group. For example, if a cordierite-forming mixture contains 10.0% by weight of an alumina having a median particle diameter of 6.6 μm and 15.0% by weight of an alumina having a median particle diameter of 0.5 μm, the value of $D_{50,A}$ is equal to $(1/25)\{10.0(6.6)+15.0(0.5)\}=2.94$.

In some embodiments, the total amount of aluminosilicate raw material in the cordierite-forming mixture is preferably less than about 25.0% by weight of the total inorganic content of the cordierite-forming mixture, such as less than about 20.0% by weight, less than about 15.0% by weight, or less than about 10.0% by weight of the total inorganic content of the cordierite-forming mixture. In some embodiments, the cordierite-forming mixture is substantially free of aluminosilicate materials. The total amount of aluminosilicate raw material is the sum of $Al_2SiO_5$ raw materials, mullite raw materials, platy aluminum silicate raw materials, and any other aluminosilicate raw materials. If present in the cordierite-forming mixture, an aluminosilicate powder of a coarse particle size yields a cordierite ceramic having a greater extent of microcracking and lower CTE than does a finer aluminosilicate powder. Equations 1 and 2 above advantageously use this dependence of CTE on the particle sizes, amounts, and mineral phases of the alumina and aluminosilicate raw materials to facilitate selection of raw materials that will produce ceramic articles with favorable characteristics. As explained above, a lower value for the C parameter in Equation 2 has been found to yield fired ceramic bodies with lower CTE. In some embodiments, if aluminosilicate raw materials are present in the cordierite-forming mixture, the median particle diameter ($D_{50}$) of the aluminosilicate powders (as measured by a laser diffraction particle size analyzer) is at least about 4 microns, such as at least about 6 microns, at least about 8 microns, at least about 10 microns, and at least about 12 microns.

In some embodiments, the cordierite-forming mixture may comprise other material powders. More specifically, the cordierite-forming mixture may comprise other sources of magnesium, such as talc. Talc may also be present in the cordierite-forming mixture as an impurity in the chlorite raw material and/or as a separate additional raw material powder. The cordierite-forming mixture may comprise talc in an amount of not more than about 45% by weight of the total inorganic content of the cordierite-forming mixture. In further embodiments, the cordierite-forming mixture may comprise the talc in an amount of not more than about 35% by weight, in an amount of not more than about 25% by weight, in an amount of not more than about 15% by weight, or in an amount of not more than about 5% by weight of the total inorganic content of the cordierite-forming mixture. In some embodiments, the cordierite-forming mixture is substantially free of talc.

In some embodiments, the composition of the cordierite-forming mixture on a simple metal oxide basis in weight percent (excluding fugitive components such as $H_2O$, $CO_2$, and $SO_2$) satisfies one or more of the following relationships:

(wt % MgO+wt % $Al_2O_3$+wt % $SiO_2$)≥90,

10≤100[wt % MgO/(wt % MgO+wt % $Al_2O_3$+wt % $SiO_2$)]≤16,

31≤100[wt % $Al_2O_3$/(wt % MgO+wt % $Al_2O_3$+wt % $SiO_2$)]≤40, and/or

47≤100[wt % $SiO_2$/(wt % MgO+wt % $Al_2O_3$+wt % $SiO_2$)]≤56.

Ceramic articles produced from such cordierite-forming mixtures may also have the same composition on a simple metal oxide basis.

In more specific embodiments, the composition of the cordierite-forming mixture on a simple metal oxide basis in weight percent (excluding fugitive components such as $H_2O$, $CO_2$, and $SO_2$) satisfies one or more of the following relationships:

(wt % MgO+wt % $Al_2O_3$+wt % $SiO_2$)≥95, 12.5≤100[wt % MgO/(wt % MgO+wt % $Al_2O_3$+wt % $SiO_2$)]≤15,

33≤100[wt % $Al_2O_3$/(wt % MgO+wt % $Al_2O_3$+wt % $SiO_2$)]≤37, and

49≤100[wt % $SiO_2$/(wt % MgO+wt % $Al_2O_3$+wt % $SiO_2$)]≤53.

Ceramic articles produced from such cordierite-forming mixtures may also have the same compositions on a simple metal oxide basis.

In further embodiments, the composition of the cordierite-forming mixture on a simple metal oxide basis in weight percent (excluding fugitive components such as $H_2O$, $CO_2$, and $SO_2$) satisfies one or more the following relationships:

$$(\text{wt \% MgO} + \text{wt \% Al}_2\text{O}_3 + \text{wt \% Si}_2) \geq 98,$$

$$13 \leq 100[\text{wt \% MgO}/(\text{wt \% MgO} + \text{wt \% Al}_2\text{O}_3 + \text{wt \% SiO}_2)] \leq 14,$$

$$34 \leq 100[\text{wt \% Al}_2\text{O}_3/(\text{wt \% MgO} + \text{wt \% Al}_2\text{O}_3 + \text{wt \% SiO}_2)] \leq 35,$$

$$50 \leq 100[\text{wt \% SiO}_2/(\text{wt \% MgO} + \text{wt \% Al}_2\text{O}_3 + \text{wt \% SiO}_2)] \leq 52,$$

Ceramic articles produced from such cordierite-forming mixtures may also have the same compositions on a simple metal oxide basis.

In various embodiments, the inorganic raw materials used in the cordierite-forming mixture are selected to be of a sufficiently high purity so as to produce a ceramic article that comprises not more than about 0.5% by weight of a sum of alkali element oxides, alkaline earth element oxides (excluding MgO), and rare earth element oxides based upon a sum of all metal oxide components (excluding fugitive components such as $H_2O$, $CO_2$, or $SO_2$) in the ceramic article. A "rare earth element" comprises yttrium and lanthanide elements. In further embodiments, the raw materials are of a sufficiently high purity so as to provide a ceramic body comprising not more than about 0.4% by weight, not more than about 0.3% by weight, not more than about 0.2% by weight, or not more than about 0.1% by weight of a sum of alkali element oxides, alkaline earth element oxides (excluding MgO), and rare earth element oxides based upon a sum of all metal oxide components (excluding fugitive components such as $H_2O$, $CO_2$, or $SO_2$) in the ceramic article.

In addition to the inorganic content described above, the cordierite-forming mixture may also comprise other components. For example, the cordierite-forming mixture typically comprises a liquid vehicle, such as water or an organic solvent, and a binder, such as a cellulose ether binder (e.g., methylcellulose, hydroxypropyl methylcellulose, and/or methylcellulose derivatives). The cordierite-forming mixture also may comprise a pore former, such as carbon, graphite, starch, nut shell flour, and/or polymer pore formers. The cordierite-forming mixture may also comprise plasticizers and lubricants. The inorganic content and the other components of the cordierite-forming mixture are mixed together to form a wet cordierite-forming mixture.

At process 104 of the method 100, the wet cordierite-forming mixture is formed into a green body. The wet cordierite-forming mixture can be extruded to form a green body that, for example, comprises a network of walls that extend in an axial direction about a longitudinal axis from an inlet end to an outlet end of the green body. The network of walls defines a plurality of cells. As formed mixture exits the extruder, the extrudate can be cut to form the green body. The green body is then dried, for example, by using a hot air and/or microwave energy. Various embodiments of the green body may comprise some or all of the compositions described above and may satisfy some or all of the compositional relationships described above, such as in Equations 1-6.

At process 106, the green body is fired to form the porous ceramic article comprising cordierite. In some embodiments, the green body is fired to a maximum temperature of between 1360° C. and 1440° C., such as between 1380° C. and 1430° C. or between 1390° C. and 1420° C. The body may be held at the maximum temperature for a period of time of between 5 and 50 hours, such as between 10 and 40 hours or between 15 and 30 hours. The fired porous cordierite ceramic article may have the honeycomb form of the articles shown in FIGS. 3 and 4.

Porous Ceramic Article Comprising Cordierite

FIG. 3 shows an example of a porous cordierite ceramic article 310 that may be made using the method described herein. The ceramic article 310 may be suitable for use as a flow-through catalyst substrate. The ceramic honeycomb article 310 has a honeycomb structure that comprises a network of walls 314 that extend in an axial direction about a longitudinal axis from an inlet end 312 to an outlet end 313. The walls 314 define a plurality of cells 311 that form a honeycomb structure. The term "honeycomb" refers to a connected structure with a generally repeating pattern of longitudinally-extending cells formed of walls. The cells 311 are not plugged and allow fluid to flow from an inlet end 312 to an outlet end 313. The ceramic article 10 also comprises an outermost layer or external skin 315 formed about the honeycomb structure. The skin 315 may be formed as part of the ceramic article 310 during the extrusion process or the skin may be formed in later processing as an after-applied skin. In some embodiments, the wall thickness of each cell wall 314 can be, for example, between about 0.002 to about 0.010 inches (about 51 to about 254 μm). The cell density can be, for example, from about 300 to about 900 cells per square inch (cpsi). In one implementation, the cellular honeycomb structure comprises a plurality of parallel cells 311 of generally square cross section. Alternatively, other cross-sectional configurations may be used in the honeycomb structure as well, including rectangular cells, round cells, oblong cells, triangular cells, octagonal cells, hexagonal cells, or combinations thereof.

FIG. 4 shows another example of a porous cordierite ceramic article 400. In this case, the ceramic article 400 may be suitable for use as a wall-flow exhaust gas particulate filter, such as a diesel particulate filter or a gasoline engine particulate filter. The ceramic article 400 comprises a body 401 made of intersecting porous ceramic walls 406 extending from the inlet end 402 to the outlet end 404. Some cells are designated as inlet cells 408, while other cells are designated as outlet cells 410. In the filter 400, some channels comprise plugs 412. Generally, the plugs are arranged at the ends of the channels and in a defined pattern, such as the checkerboard patterns shown in FIG. 4. The inlet channels 408 are plugged at the outlet end 404 and the outlet channels 410 are plugged at the inlet end 402. In some embodiments, all of the outermost peripheral cells are plugged (as shown) for additional strength. Other plugging patterns may be used. In some embodiments, some channels can be flow-through channels and some can be plugged providing a "partial filtration" design. In some embodiments, the wall thickness of each cell wall 14 for the filter can be, for example, from about 0.003 to about 0.030 inches (about 76 to about 762 μm). The cell density can be, for example, between about 100 and 400 cells per square inch (cpsi).

In some embodiments, the porous cordierite ceramic article comprises a cordierite phase that comprises greater than about 85.0% by weight of a total of all crystalline phases within the porous cordierite ceramic article. The cordierite phase may comprise hexagonal and/or orthorhombic cordierite. In further embodiments, the porous cordierite ceramic article comprises a cordierite phase in an amount greater than about 90.0% by weight, greater than about 95.0% by weight, or greater than about 98.0% by weight of a total of all crystalline phases within the porous cordierite ceramic article.

The fired porous ceramic article may comprise other phases. For example, the ceramic article may comprise spinel, sapphirine, mullite, and/or corundum. In some embodiments, a sum of spinel phase, sapphirine phase, mullite phase, and corundum phase in the porous cordierite ceramic article comprises no greater than about 10% by weight of a total of all crystalline phases within the porous cordierite ceramic article, such as no greater than about 8% by weight, no greater than about 6% by weight, no greater than about 4% by weight, or no greater than about 2% by weight of the total of all crystalline phases within the porous cordierite ceramic article. In yet further embodiments, the porous cordierite ceramic article may comprise cristobalite. The porous cordierite ceramic article may comprise cristobalite phase in an amount no greater than about 5.0% by weight of a total of all crystalline phases within the porous cordierite ceramic article, such as no greater than about 3.0% by weight, no greater than about 2.0% by weight, or no greater than about 1.0% by weight of the total of all crystalline phases within the porous cordierite ceramic article. In some embodiments, the porous cordierite ceramic is substantially free of cristobalite phase.

In various embodiments, the porous ceramic article comprises a porosity in a range between about 25% and about 85%. In some embodiments, the porous ceramic article comprises a porosity of at least about 35%, such as at least about 45%, at least about 55%, at least about 60%, or at least about 65%. Values of percent porosity are determined by mercury porosimetry.

In some embodiments, the method shown in FIG. 1 produces a porous cordierite ceramic body with a low CTE from 25° C. to 800° C. that is less than or equal to about $14 \times 10^{-7}$ °C.$^{-1}$ along at least one direction of the ceramic article, such as less than or equal to about $12 \times 10^{-7}$ °C.$^{-1}$, less than or equal to about $10 \times 10^{-7}$ °C.$^{-1}$, less than or equal to about $9 \times 10^{-7}$ °C.$^{-1}$, less than or equal to about $8 \times 10^{-7}$ °C.$^{-1}$, less than or equal to about $6 \times 10^{-7}$ °C.$^{-1}$, less than or equal to about $3 \times 10^{-7}$ °C.$^{-1}$, or less than or equal to about $2 \times 10^{-7}$ °C.$^{-1}$.

Figure 6:
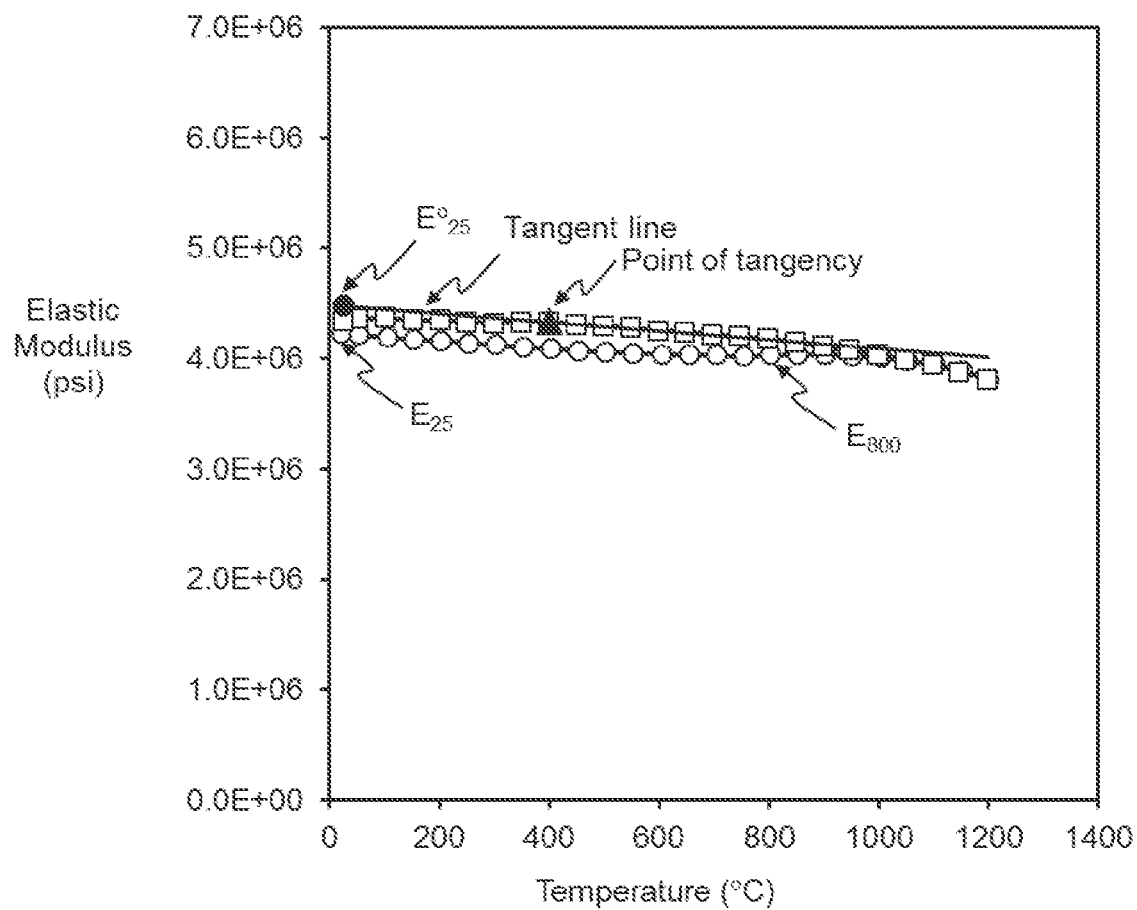
FIG. 6 shows a plot of Young's elastic modulus versus temperature for Example 6 in accordance with one embodiment of the present disclosure.

The CTE that characterizes the fired porous cordierite ceramic articles prepared by the method described herein depends to an extent on microcracking within the articles. The extent of microcracking may be quantified by measurement of the Young's elastic modulus (E) of the ceramic from room temperature to 1200° C. and back to room temperature at, for example, 50° C. intervals. The elastic modulus is measured by a sonic resonance technique on a sample of a ceramic article. A solid or honeycomb rod or bar of circular or rectangular cross section can be used as the sample. Although the sample geometry will influence the absolute values of elastic modulus, the sample geometry should not influence the ratios of the elastic moduli described below (e.g., $E_{800°\ C}/E_{25°\ C}$ and $E_{25°\ C}/E°_{25°\ C}$). The elastic modulus of a non-microcracked cordierite ceramic decreases slightly with increasing temperature due to the thermal vibration of the atomic bonds in the crystal structure. The rate of decrease, $\Delta F/\Delta T$, from 25° C. to about 1000° C. is equal to approximately $(-7.5 \times 10^{-5})(E°_{25°\ C})°C^{-1}$, where $E°_{25°\ C}$ is the elastic modulus of the non-microcracked specimen at 25° C. The value of $E°_{25°\ C}$ depends upon the amount of porosity in the ceramic article, and also upon whether the article is of a cellular or solid geometry. The elastic modulus is sometimes observed to decrease with temperature at a greater rate upon approaching 1200° C. due to the softening of a grain-boundary phase that contains impurities in the ceramic article. Upon cooling back to room temperature, the elastic modulus versus temperature curve is observed to follow a path that is close to or equal to the path defined by the heating curve if the ceramic article is not initially microcracked at room temperature. FIG. 6 shows an example of an elastic modulus versus temperature curve with a cooling portion that follows a heating portion.

Figure 5:
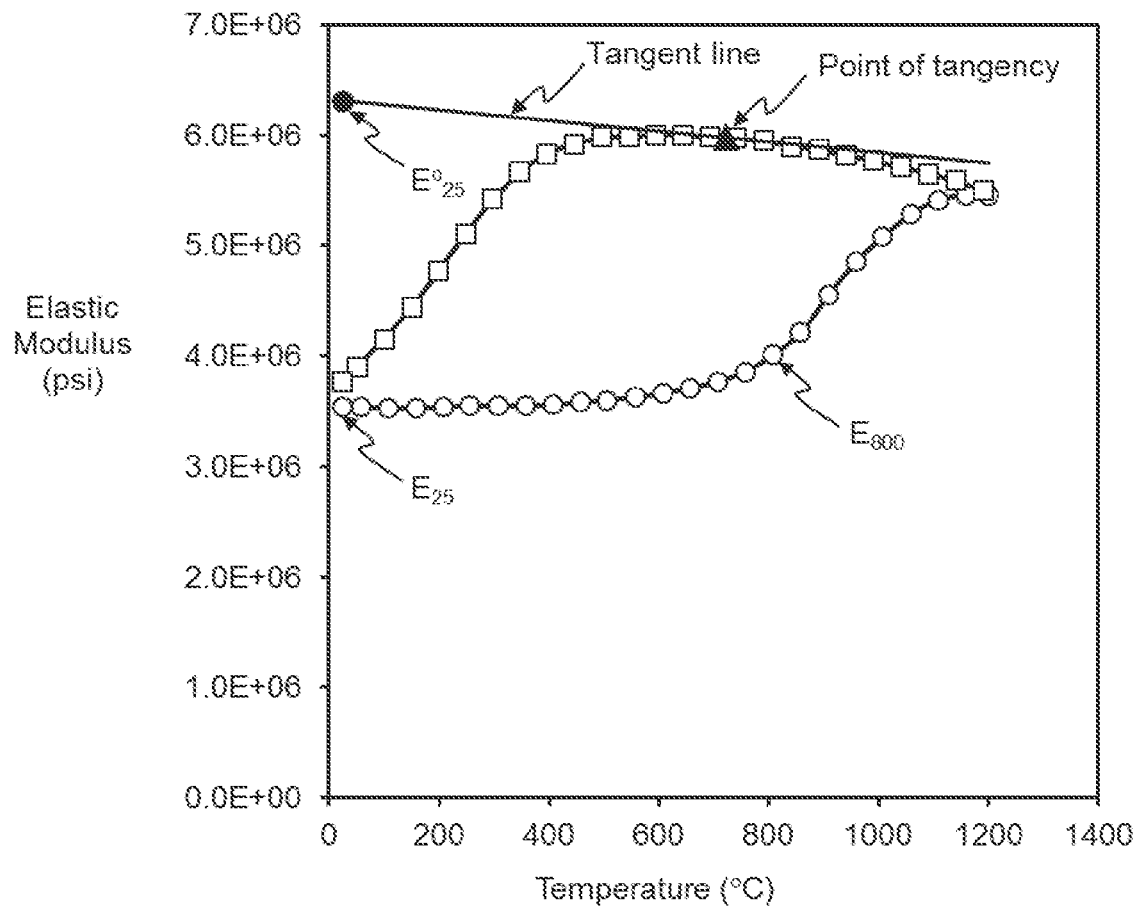
FIG. 5 shows a plot of Young's elastic modulus versus temperature for Example 5 in accordance with one embodiment of the present disclosure.

By contrast, when the ceramic article is initially microcracked at room temperature, the microcracks gradually reclose during heating, causing a stiffening of the ceramic material and an increase in the elastic modulus with increasing temperature. This is especially evident between about 700° C. and 1100° C. By about 1100° C., the microcracks are closed and annealed, and the ceramic is in a non-microcracked state from about 1100 to 1200° C. during heating. Upon cooling from 1200° C., the microcracks do not immediately reopen, but remain closed at lower temperatures. During these initial stages of cooling, the ceramic article remains in a non-microcracked state, and the elastic modulus increases slightly with decreasing temperature. Eventually, the internal stresses within the ceramic article achieve a level at which the microcracks reopen with further cooling, and the elastic modulus continuously decreases to room temperature. Thus, the E versus temperature behavior of a microcracked ceramic material is manifested by a hysteresis, and the magnitude of the hysteresis is proportional to the amount of microcracking in the original ceramic article at room temperature. FIG. 5 shows an example of the hysteresis.

The hysteresis may be quantified using two different ratios (e.g., $E_{800°\ C}/E_{25°\ C}$ and $E_{25°\ C}/E°_{25°\ C}$). In accordance with one method for quantifying the amount of microcracking by the hysteresis in the E vs. T curve, the elastic modulus ratio $E_{800°\ C}/E_{25°\ C}$ is calculated from the measured value of $E_{25°\ C}$ (the initial elastic modulus of the sample at 25° C.) and $E_{800°\ C}/E_{25°\ C}$ value of elastic modulus measured at 800° C. during heating). In some embodiments, the fired porous cordierite ceramic articles prepared by the method described herein have a $E_{800°\ C}/E_{25°\ C}$ ratio of at least about 1.00, such as at least about 1.02, at least about 1.04, at least about 1.06, at least about 1.08, at least about 1.10, or at least about 1.12. A higher value of $E_{800°\ C}/E_{25°\ C}$ indicates a greater extent of microcracking in the fired ceramic article at room temperature and the partial reclosing of these microcracks at 800° C.

An additional or alternative method for quantifying the amount of microcracking by the hysteresis in the E vs. T curve is to determine the elastic modulus ratio, $E_{25°\ C}/E°_{25°\ C}$, where $E°_{25°\ C}$ represents the estimated value of the elastic modulus of the ceramic in a non-microcracked state at room temperature. The value of $E°_{25°\ C}$ is obtained by constructing a tangent line to the near-linear portion of the E vs. temperature curve measured during cooling after heating to 1200° C. This near-linear portion is typically observed to lie somewhere between about 900° C. and 400° C. The tangent is then extrapolated back to 25° C., and the value of the tangent line at 25° C. is $E°_{25°\ C}$. The exact position and the slope of the tangent line to the E vs. T cooling curve is constrained by the restriction that the tangent line must have a slope equal to that for a non-microcracked cordierite ceramic, which is $(-7.5 \times 10^{-5})(E°_{25°\ C})$. The slope of the tangent, its point of interception with the elastic modulus cooling curve, and the value of $E°_{25° C.}$ are determined by an iterative method because the slope of the tangent is required to determine $E°_{25° C.}$ and the value of $E°_{25° C.}$ is required to determine the slope of the tangent. In some embodiments, the ceramic articles prepared by the method described herein preferably have a ratio $E_{25° C.}/E°_{25° C.}$ of not more than about 0.92, such as not more than about 0.90, not more than about 0.80, not more than about 0.75, not more than about 0.70, not more than about 0.65, and not more than about 0.60. Smaller values of $E_{25° C.}/E°_{25° C.}$ indicate greater amounts of microcracking in the actual ceramic at 25° C. because the microcracking lowers the value of E relative to its value for a non-microcracked ceramic of equivalent porosity and internal specimen geometry (solid or cellular).

In some embodiments, when extrusion is used to form the green body, the resulting fired ceramic body preferably has an axial I-ratio ($I_A$) of less than or equal to 0.55 and/or a transverse I-ratio ($I_T$) of greater than or equal to 0.80. The I-ratio is defined as the ratio $I_{(110)}/[I_{(110)}+I_{(002)}]$ in which I(hkl) is a peak height of a hkl reflection measured by x-ray diffractometry. The axial I-ratio ($I_A$) is the I-ratio as measured on an axial cross section of the honeycomb structure of the ceramic article (orthogonal to the direction of the channels). The transverse I-ratio ($I_T$) is the I-ratio measured on a flat, as-fired surface of the channel walls after removal of the orthogonal channel walls projecting from the surface to be measured. Further details regarding measurement of the axial I-ratio ($I_A$) and the transverse I-ratio ($I_T$) can be found in U.S. Pat. No. 5,258,150, issued on Nov. 2, 1993, which is hereby incorporated herein by reference in its entirety. A lower axial I-ratio ($I_A$) and a higher transverse I-ratio ($I_T$) represent an increasing degree of preferred alignment of the cordierite crystals in the plane of the wall. In some embodiments, the axial I-ratio is not more than about 0.52, not more than about 0.50, not more than about 0.48, not more than about 0.46, not more than about 0.44, not more than about 0.42, or not more than about 0.40. In some embodiments, the transverse I-ratio is at least about 0.82, at least about 0.84, or at least about 0.86.

Known methods directed to formation of cordierite ceramics using a chlorite raw material use large amounts of aluminosilicate clay in the raw material mixture (typically comprising 40 to 60% by weight of the batch). Ceramic articles made by these methods suffer from an undesirably high CTE (e.g., CTE values from 25 to 800° C. of at least $13 \times 10^{-7°}$ C.$^{-1}$). In some embodiments, the methods described herein produce cordierite articles with low CTEs because the methods replace some or all of the aluminosilicate clay with an alumina source material and a silica source material, which, in various embodiments, reduces the CTE to a value of less than $12 \times 10^{-7°}$ C.$^{-1}$. Also, known methods teach away from using an alumina source material (i) because the alumina source increases wear on forming dies used to shape batch from the raw material mixture and (ii) because the alumina source material needs to be milled to a sufficiently small particle size to promote reaction to form cordierite during firing. Thus, there is no indication from previous known methods that the replacement of aluminosilicate clay with an alumina source material and a silica source material would beneficially reduce CTE and improve thermal shock resistance.

EXAMPLES

For the purpose of illustration, examples of the methods described herein are presented in Tables 1 to 6 and described below. Table 1 lists the chemical compositions and median particle diameters of raw materials used in the examples. Median particle diameters ($D_{50}$) were measured using a laser diffraction particle size analyzer. Weight percentages of raw materials used in the cordierite-forming mixtures used to make Examples 1 to 9 are presented in Tables 2 and 3. Weight percentages of the metal oxides in the cordierite-forming mixtures and ceramics (Tables 2 and 3) were computed from the compositions of the raw materials (Table 1) excluding fugitive components such as $H_2O$.

TABLE 1

| | Weight Percentages | | | | | | | | | |
|---|---|---|---|---|---|---|---|---|---|---|
| | MgO | $Al_2O_3$ | $SiO_2$ | $Fe_2O_3$ | $TiO_2$ | CaO | $Na_2O$ | $K_2O$ | Est. $H_2O$ | $D_{50}$ (μm) |
| Chlorite A | 32.70 | 20.20 | 31.80 | 0.22 | 0.150 | 0.028 | 0.005 | 0.013 | 14.9 | 18.6 |
| Chlorite B | 32.50 | 19.60 | 32.60 | 0.26 | 0.079 | 0.100 | 0.004 | 0.006 | 14.9 | 6.9 |
| Talc | 30.23 | 0.31 | 62.52 | 1.51 | trace | trace | 0.15 | 0.05 | 5.2 | — |
| Alumina A | 0.00 | 99.90* | 0.008 | 0.014 | 0.000 | 0.010 | 0.067 | 0.005 | 0.0 | 6.6 |
| Alumina B | 0.044 | 99.80* | 0.037 | 0.013 | 0.000 | 0.035 | 0.061 | 0.010 | 0.0 | 0.5 |
| Quartz | 0.008 | 0.260 | 99.52* | 0.047 | 0.018 | 0.009 | 0.076 | 0.042 | 0.0 | 4.5 |
| Kaolin A | 0.070 | 38.18 | 45.10 | 0.210 | 0.990 | 0.050 | 0.070 | 0.040 | 15.3 | 7.3 |
| Kaolin B | 0.120 | 38.02 | 44.80 | 0.300 | 1.50 | 0.050 | 0.060 | 0.050 | 15.1 | 3.4 |
| Mullite A | 0.00 | 73.19 | 25.65 | 0.22 | 0.02 | 0.00 | 0.00 | 0.00 | 0.9 | 17.6 |
| Mullite B | 0.02 | 76.10 | 23.30 | 0.04 | 0.01 | 0.05 | 0.13 | 0.06 | 0.3 | 6.0 |
| Kyanite A | 0.06 | 56.30 | 41.00 | 0.63 | 1.47 | 0.04 | 0.03 | 0.04 | 0.4 | 12.0 |
| Kyanite B | 0.06 | 56.30 | 41.00 | 0.63 | 1.47 | 0.04 | 0.03 | 0.04 | 0.4 | 8.5 |

*Not measured, computed by difference from 100%

TABLE 2

Raw material mixtures used in Examples 1 to 4 and calculated ceramic composition

| Composition | A | B | C | D |
|---|---|---|---|---|
| Chlorite A | 39.59 | 39.43 | 39.06 | 38.70 |
| Kaolin A | 0 | 0 | 0 | 16.00 |
| Mullite A | 0 | 33.69 | 0 | 0 |
| Kyanite A | 0 | 0 | 43.49 | 0 |
| Alumina A | 24.75 | 0 | 0 | 17.88 |
| Quartz | 35.66 | 26.88 | 17.45 | 27.42 |
| MgO | 13.79 | 13.73 | 13.62 | 13.81 |
| $Al_2O_3$ | 34.85 | 34.96 | 34.52 | 34.70 |
| $SiO_2$ | 51.07 | 50.98 | 50.62 | 50.98 |
| $Fe_2O_3$ | 0.114 | 0.185 | 0.392 | 0.146 |
| $TiO_2$ | 0.070 | 0.075 | 0.746 | 0.242 |
| $Na_2O$ | 0.048 | 0.024 | 0.030 | 0.050 |
| $K_2O$ | 0.023 | 0.017 | 0.032 | 0.026 |
| CaO | 0.018 | 0.014 | 0.030 | 0.025 |
| MgO + $Al_2O_3$ + $SiO_2$ | 99.71 | 99.67 | 98.76 | 99.49 |

TABLE 2-continued

Raw material mixtures used in Examples 1 to 4 and calculated ceramic composition

| Composition | A | B | C | D |
|---|---|---|---|---|
| A + AE* + RE Oxides | 0.089 | 0.056 | 0.091 | 0.101 |

*Excludes MgO

TABLE 3

Raw material mixtures used in Examples 5 to 9 and calculated ceramic composition

| Composition | E | F | G | H | J |
|---|---|---|---|---|---|
| Chlorite B | 39.82 | 39.72 | 39.28 | 38.93 | 38.93 |
| Kaolin A | 0 | 0 | 0 | 16.00 | 0 |
| Kaolin B | 0 | 0 | 0 | 0 | 16.00 |
| Mullite B | 0 | 32.71 | 0 | 0 | 0 |
| Kyanite B | 0 | 0 | 43.81 | 0 | 0 |
| Alumina B | 24.93 | 0 | 0 | 18.06 | 18.06 |
| Quartz | 35.25 | 27.57 | 16.91 | 27.02 | 27.02 |
| MgO | 13.80 | 13.76 | 13.62 | 13.81 | 13.83 |
| $Al_2O_3$ | 34.82 | 34.86 | 34.51 | 34.68 | 34.63 |
| $SiO_2$ | 51.07 | 51.02 | 50.61 | 50.98 | 50.90 |
| $Fe_2O_3$ | 0.131 | 0.138 | 0.411 | 0.164 | 0.179 |
| $TiO_2$ | 0.040 | 0.042 | 0.722 | 0.213 | 0.301 |
| CaO | 0.046 | 0.068 | 0.029 | 0.048 | 0.046 |
| $Na_2O$ | 0.021 | 0.035 | 0.029 | 0.024 | 0.026 |
| $K_2O$ | 0.055 | 0.063 | 0.060 | 0.061 | 0.061 |
| MgO + $Al_2O_3$ + $SiO_2$ | 99.69 | 99.64 | 98.74 | 99.47 | 99.36 |
| A + AE* + RE Oxides | 0.122 | 0.167 | 0.118 | 0.133 | 0.133 |

*Excludes MgO

Cordierite-forming mixtures comprising 1500 grams of inorganic raw materials were weighed out and mixed with 90 grams of methyl cellulose and 15 grams of sodium stearate in a Processall Mixer. Each mixture was placed in a stainless steel muller and plasticized with 370 to 420 ml of deionized water. The material was transferred to a ram extruder, vacuum was pulled on the mixture, and the material was passed through a spaghetti die several times before being extruded as 8 mm diameter rod and 25.4 mm (1 inch) diameter cellular ware with a cell density of 31 cells/cm² (200 cells/in²) and a wall thickness of 0.41 mm (0.016 in). The rod was cut into sections that were placed in glass tubes. Cellular ware was cut into segments and wrapped in aluminum foil. The extruded products were dried in a convection oven for several days. Dried material was further cut to desired lengths, set in an alumina tray, and fired in an electric furnace at 50° C./h to 1400° C., held for 20 hours, and cooled at a nominal rate of 500° C./h. The cooling rate was slower at lower temperatures due to the thermal mass of the furnace.

The coefficient of thermal expansion of cellular ware along the direction of the lengths of the channels was measured from room temperature to 1000° C. and back to room temperature by dilatometry. Values of the mean CTE from room temperature to 800° C., room temperature to 1000° C., and from 500° C. to 900° C., all upon heating, were calculated. The axial and transverse I-ratio values were measured on the cellular ware by x-ray diffractometry. The I-ratio of crushed and pulverized powder samples was also determined by loading the powder samples into a sample holder. This material was also used to determine the weight percentages of spinel, mullite, corundum, and cristobalite in the fired ware by X-ray diffraction, from which percentage by weight of cordierite was derived by difference from 100%. Values of the C parameter for each sample were computed from the cordierite-forming mixture and the particle sizes of the raw materials.

Values of percent porosity and pore size distribution were determined by mercury porosimetry. The values of $d_{10}$, $d_{50}$, and $d_{90}$ are the pore diameters at the tenth, fiftieth, and ninetieth percentiles of the cumulative pore size distribution function, respectively, based upon pore volume. The cumulative pore size distribution function begins with the lowest pore size and ends at the highest pore size, whereby $d_{10} < d_{50} < d_{90}$. The value of $d_{50}$ therefore is equal to the median pore diameter of the ceramic. Modulus of rupture was measured on rods using a four-point method with a support span of 2 inches and a load span of 0.75 inch. Young's elastic modulus was measured from room temperature to 1200° C. using a sonic resonance technique.

Physical properties and C parameter values of Examples 1 to 9 are provided in Tables 4 and 5.

TABLE 4

Physical properties of Examples 1 to 4

| Example Number | 1 | 2 | 3 | 4 |
|---|---|---|---|---|
| Composition | A | B | C | D |
| Pore Volume (ml/g) | 0.2797 | 0.3485 | 0.3519 | 0.3786 |
| Porosity (%) | 41.2 | 46.9 | 48.1 | 49.3 |
| $d_{10}$ (μm) | 4.8 | 4.4 | 3.1 | 3.3 |
| $d_{50}$ (μm) | 6.9 | 11.2 | 7.7 | 7.1 |
| $d_{90}$ (μm) | 9.7 | 16.2 | 11.6 | 10.1 |
| $(d_{50} - d_{10})/d_{50}$ | 0.31 | 0.61 | 0.60 | 0.54 |
| $(d_{90} - d_{10})/d_{50}$ | 0.71 | 1.05 | 1.11 | 0.96 |
| $CTE_{25-800° C.}$ ($10^{-7}$ °$C.^{-1}$) | 11.8 | 11.8 | 11.8 | 8.6 |
| $CTE_{25-1000° C.}$ ($10^{-7}$ °$C.^{-1}$) | 13.4 | 13.9 | 14.2 | 10.6 |
| $CTE_{500-900° C.}$ ($10^{-7}$ °$C.^{-1}$) | 17.2 | 19.7 | 19.7 | 15.6 |
| Axial I-Ratio | 0.40 | 0.49 | 0.57 | 0.52 |
| Powder I-Ratio | 0.61 | 0.66 | 0.67 | 0.66 |
| Transverse I-Ratio | 0.87 | 0.85 | 0.76 | 0.83 |
| Mullite | 0 | 0 | 0 | 0 |
| Spinel | 8.0 | 2.4 | 1.0 | 2.0 |
| Alumina | 0.3 | 0 | 0 | 0.1 |
| Cristobalite | 3.5 | 0 | 0 | 0 |
| Cordierite | 88.2 | 97.6 | 99.0 | 97.9 |
| C Parameter | 9.0 | 10.4 | 10.5 | 9.3 |
| MOR (psi) | 2775 | 1955 | 2169 | 1831 |
| $E_{25° C.}$ (psi) | 3.65E+06 | 2.68E+06 | 3.09E+06 | 2.23E+06 |
| $E°_{25° C.}$ (psi) | 4.30E+06 | 3.01E+06 | 3.54E+06 | 3.04E+06 |
| $E_{800° C., Heating}$ (psi) | 3.56E+06 | 2.62E+06 | 3.09E+06 | 2.37E+06 |
| $E_{25° C.}/E°_{25° C.}$ | 0.811 | 0.891 | 0.874 | 0.734 |
| $E_{800° C., Heating}/E_{25° C.}$ | 1.020 | 0.978 | 1.000 | 1.063 |
| MOR/E | 0.076% | 0.073% | 0.070% | 0.082% |

TABLE 5

Physical properties of Examples 5 to 9

| Example Number | 5 | 6 | 7 | 8 | 9 |
|---|---|---|---|---|---|
| Composition | E | F | G | H | J |
| Pore Volume (ml/g) | 0.2163 | 0.3198 | 0.3085 | 0.2594 | 0.2559 |
| Porosity (%) | 35.2 | 45.2 | 41.6 | 38.0 | 38.2 |
| $d_{10}$ (μm) | 1.4 | 2.1 | 2.0 | 1.6 | 1.5 |
| $d_{50}$ (μm) | 2.6 | 6.1 | 4.7 | 3.0 | 3.1 |
| $d_{90}$ (μm) | 3.7 | 8.3 | 7.3 | 4.2 | 4.6 |
| $(d_{50} - d_{10})/d_{50}$ | 0.46 | 0.65 | 0.57 | 0.47 | 0.53 |
| $(d_{90} - d_{10})/d_{50}$ | 0.85 | 1.01 | 1.11 | 0.84 | 1.02 |
| $CTE_{25-800° C.}$ ($10^{-7°}$ $C.^{-1}$) | 0.6 | 15.1 | 14.8 | 6.6 | 9.3 |
| $CTE_{25-1000° C.}$ ($10^{-7°}$ $C.^{-1}$) | 2.3 | 17.2 | 16.6 | 8.5 | 11.4 |
| $CTE_{500-900° C.}$ ($10^{-7°}$ $C.^{-1}$) | 7.8 | 22.5 | 22.2 | 13.9 | 16.6 |
| Axial I-Ratio | 0.42 | 0.60 | 0.60 | 0.52 | 0.57 |
| Powder I-Ratio | 0.65 | 0.65 | 0.64 | 0.63 | 0.62 |
| Transverse I-Ratio | 0.86 | 0.74 | 0.73 | 0.82 | 0.75 |
| Mullite | 0 | 0 | 0 | 0 | 0 |
| Spinel | 2.2 | 1.8 | 0 | 1.6 | 1.4 |
| Alumina | 0.1 | 0 | 0 | 0 | 0 |
| Cristobalite | 0 | 0 | 0 | 0 | 0 |
| Cordierite | 97.7 | 98.2 | 100.0 | 98.4 | 98.6 |
| C Parameter | 0.7 | 13.7 | 13.5 | 3.3 | 8.0 |
| MOR (psi) | 2909 | 3756 | 2169 | 2492 | 3997 |
| $E_{25° C.}$ (psi) | 3.54E+06 | 4.23E+06 | 4.36E+06 | 4.10E+06 | 4.64E+06 |
| $E°_{25° C.}$ (psi) | 6.31E+06 | 4.48E+06 | 4.64E+06 | 5.27E+06 | 6.26E+06 |
| $E_{800° C., Heating}$ (psi) | 4.01E+06 | 4.03E+06 | 4.21E+06 | 4.24E+06 | 4.90E+06 |
| $E_{25° C.}/E°_{25° C.}$ | 0.561 | 0.944 | 0.939 | 0.777 | 0.741 |
| $E_{800° C., Heating}/E_{25° C.}$ | 1.133 | 0.953 | 0.966 | 1.034 | 1.056 |
| MOR/E | 0.082% | 0.089% | 0.050% | 0.061% | 0.086% |

Example 1 was prepared according to the method described herein based upon a raw material mixture comprising chlorite, corundum, and quartz. The relatively coarse particle sizes of the chlorite and corundum and the refractory nature of the raw materials resulted in residual spinel (8% by weight), corundum (0.3% by weight), and cristobalite (3.5% by weight) in the fired ceramic, corresponding to 88.2% cordierite by weight. The calculated C parameter for this sample was 9.0 and the value of CTE (RT-800° C.) was 11.8×$10^{-7°}$ $C.^{-1}$. The values of $E_{800° C.}/E_{25° C.}$=1.02 and $E_{25° C.}$0.811 indicate the presence of sufficient microcracking to offset the presence of the high-expansion secondary phases and provide a ceramic article with a usefully low CTE.

Example 2 was prepared according to the method described herein based upon a raw material mixture comprising chlorite, mullite, and quartz. The fired ceramic article contained only 2.4% spinel by weight and, therefore, 97.6% cordierite by weight. Due to the coarse size of the mullite raw material, the value of the C parameter is 10.4 and the value of CTE (RT-800° C.) is 11.8×$10^{-7°}$ $C.^{-1}$ (both within the preferred ranges). The values of $E_{800° C.}/E_{25° C.}$=0.978 and $E_{25° C.}/E°_{25° C.}$=0.891 indicate the presence of a small amount of microcracking.

Example 3 was prepared according to the method described herein based upon a raw material mixture comprising chlorite, kyanite, and quartz. The fired ceramic article contained 1.0% spinel by weight and, therefore, 99.0% cordierite by weight. Due to the coarse size of the kyanite raw material, the value of the C parameter is 10.5 and the value of CTE (RT-800° C.) is 11.8×$10^{-7°}$ $C.^{-1}$ (both within preferred ranges). The values of $E_{800° C.}/E_{25° C.}$=1.000 and $E_{25° C.}/E°_{25° C.}$=0.874 indicate the presence of a small amount of microcracking.

Example 4 was prepared according to the method described herein based upon a raw material mixture comprising chlorite, kaolin, corundum, and quartz. The fired ceramic article contained 2.0% spinel by weight and 0.1% corundum by weight and, therefore, 97.9% cordierite by weight. Due to the coarse size of the kaolin raw material and its limitation to only 16% by weight of the cordierite-forming mixture, the value of the C parameter is only 9.3 and the value of CTE (RT-800° C.) is only 8.6×$10^{-7°}$ $C.^{-1}$ (well within the preferred ranges). The values of $E_{800° C.}/E_{25° C.}$=1.063 and $E_{25° C.}/E°_{25° C.}$=0.734 indicate the presence of substantial microcracking.

Example 5 was prepared according to the method described herein based upon a raw material mixture comprising a fine chlorite, fine corundum, and quartz. Example 5 used finer raw materials, as compared to Example 1, allowing greater reaction among the raw materials, such that the fired ceramic article contained only 2.2% spinel by weight and 0.1% corundum by weight, and therefore 97.7% cordierite by weight. Due to the absence of an aluminosilicate raw material and the fine particle size of the alumina source material, the value of the C parameter is only 0.7 and the value of CTE (RT-800° C.) is an extremely low 0.6×$10^{-7°}$ $C.^{-1}$. The values of $E_{800° C.}/E_{25° C.}$=1.133 and $E_{25° C.}/E°_{25° C.}$=0.561 indicate the presence of a very substantial amount of microcracking. The large hysteresis between the elastic modulus heating and cooling curves is evident in FIG. 5, which shows a plot of Young's elastic modulus for Example 5 during heating from 25 to 1200° C. (open circles) and cooling back to room temperature (open squares). The tangent line to the cooling curve at the position indicated by the filled triangle indicates the path that would be taken by a non-microcracked version of the sample during further cooling. The value of the tangent line at 25° C. is $E°_{25° C.}$ This is the elastic modulus of the ceramic article of Example 5 at 25° C. in a hypothetically non-microcracked state. Also, the measured elastic modulus values of the sample are indicated at 25° C., E25° c (before heating), and at 800° C., $E_{800°\ C.}$ (during heating). The large hysteresis indicates extensive microcracking.

Example 6 was prepared according to the method described herein based upon a raw material mixture comprising fine chlorite, finer mullite, and quartz. The fired ceramic article contained only 1.8% spinel by weight and therefore 98.2% cordierite by weight. However, due to the large amount and finer size of the mullite raw material, the value of the C parameter is 13.7 and the value of CTE (RT-800° C.) is $15.1 \times 10^{-7}$° $C.^{-1}$ (both outside the preferred ranges). The values of $E_{800°\ C.}/E_{25°\ C.}=0.953$ and $E_{25°\ C.}=0.944$ indicate the presence of insufficient microcracking to provide a CTE below $14 \times 10^{-7}$° $C.^{-1}$. The very low amount of hysteresis between the elastic modulus heating and cooling curves is evident in FIG. 6, which shows a plot of Young's elastic modulus for Example 6 during heating from 25° C. to 1200° C. (open circles) and cooling back to room temperature (open squares). The tangent line to the cooling curve at the position indicated by the filled triangle indicates the path that would be taken by a non-microcracked version of the sample during further cooling. The value of the tangent line at 25° C. is $E°_{25°\ C.}$ (the elastic modulus of the ceramic of Example 6 at 25° C. in a non-microcracked state). The elastic modulus values of the sample at 25° C., $E_{25°\ C.}$ (before heating) and at 800° C., $E_{800°\ C.}$ (during heating), are also indicated. The small hysteresis indicates a small degree of microcracking.

Example 7 was prepared according to the method described herein based upon a raw material mixture comprising fine chlorite, finer kyanite, and quartz. The fired ceramic contained no residual crystalline phases and therefore 100% cordierite by weight. However, due to the large amount and finer size of the kyanite raw material, the value of the C parameter is 13.5 and the value of CTE (RT-800° C.) is $14.8 \times 10^{-7}$° $C.^{-1}$ (both outside the preferred ranges). The values of $E_{800°\ C.}/E_{25°\ C.}=0.966$ and $E_{25°\ C.}/E°_{25°\ C.}=0.939$ indicate the presence of insufficient microcracking to provide a CTE below $14 \times 10^{-7}$° $C.^{-1}$.

Example 8 was prepared according to the method described herein based upon a raw material mixture comprising fine chlorite, coarse kaolin, fine corundum, and quartz. The fired ceramic contained only 1.6% spinel by weight and, therefore, 98.4% cordierite by weight. Due to the coarse size of the kaolin raw material, its limitation to only 16% by weight of the cordierite-forming mixture, and the fine particle size of the corundum raw material, the value of the C parameter is only 3.3, and the value of CTE (RT-800° C.) is only $6.6 \times 10^{-7}$° $C.^{-1}$ (well within the preferred ranges). The values of $E_{800°\ C.}/E_{25°\ C.}=1.034$ and $E_{25°\ C.}/E°_{25°\ C.}=0.777$ indicate the presence of substantial microcracking.

Example 9 was prepared according to the method described herein based upon a raw material mixture comprising fine chlorite, fine kaolin, fine corundum, and quartz. The fired ceramic contained only 1.4% spinel by weight and, therefore, 98.6% cordierite by weight. Due to the limitation of kaolin to only 16% by weight of the cordierite-forming mixture, and also the fine particle size of the corundum raw material, the value of the C parameter is only 8.0 and the value of CTE (RT-800° C.) is only $9.3 \times 10^{-7}$° $C.^{-1}$ (well within the preferred ranges). The values of $E_{800°\ C.}/E_{25°\ C.}=1.056$ and $E_{25°\ C.}/E°_{25°\ C.}=0.741$ indicate the presence of substantial microcracking. Although the amount of microcracking in Example 9 was slightly greater than that of Example 8, the degree of orientation of the cordierite crystals within the plane of the cell walls of the honeycomb ceramic was lower in Example 9, as indicated by the higher axial I-ratio and lower transverse I-ratio. The higher CTE of Example 9 is attributed to this lower degree of cordierite crystal alignment.

It will be understood that for the purposes of this disclosure, "at least one of X, Y, and Z" can be construed as X only, Y only, Z only, or any combination of two or more items X, Y, and Z (e.g., XYZ, XY, XZ, YZ). Furthermore, it will be understood that for the purposes of this disclosure, "X, Y, and/or Z" can be construed as X only, Y only, Z only, or any combination of two or more items X, Y, and Z (e.g., XYZ, XY, XZ, YZ).

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

What is claimed is:

1. A method of making a porous ceramic article comprising cordierite, the method comprising:
   mixing a plurality of materials to form a cordierite-forming mixture, wherein the cordierite-forming mixture comprises:
   a chlorite raw material in an amount of about 5% to about 60% by weight of a total inorganic content of the cordierite-forming mixture,
   (ii) a silica source material, and
   (iii) an aluminum-containing source material, wherein the aluminum-containing source material comprises a platy aluminum silicate raw material in an amount of 0% to about 30% by weight of the total inorganic content of the cordierite-forming mixture;
   forming the cordierite-forming mixture into a green body; and
   firing the green body to form the porous ceramic article comprising cordierite,
   wherein the composition of the porous ceramic article further satisfies the following relationship:

$$A+AE+RE<0.5,$$

where A is a sum of weight percentages of alkali metal oxides, AE is a sum of weight percentages of alkaline earth metal oxides excluding MgO, and RE is a sum of weight percentages of rare earth metal oxides;
   wherein the porous ceramic article comprises a coefficient of thermal expansion of less than or equal to about $14 \times 10^{-7}$ ° $C^{-1}$ from 25 to 800° C.

2. The method of claim 1, wherein the cordierite-forming mixture comprises the chlorite raw material in an amount of about 5% to about 45% by weight of a total inorganic content of the cordierite-forming mixture.

3. The method of claim 1, wherein the chlorite raw material comprises a clinochlore.

4. The method of claim 1, wherein the cordierite-forming mixture is substantially free of the platy aluminum silicate raw material.

5. The method of claim 1, wherein the platy aluminum silicate raw material comprises at least one of pyrophyllite, kaolin clay, and ball clay.

6. The method of claim 1, wherein the aluminum-containing source material comprises a mullite raw material in an amount of 0% to about 35% by weight of the total inorganic content of the cordierite-forming mixture.

7. The method of claim 1, wherein the aluminum-containing source material comprises:
   an alumina source material in an amount of 0% to about 40% by weight of the total inorganic content of the cordierite-forming mixture;
   an $Al_2SiO_5$ raw material in an amount of 0% to about 45% by weight of the total inorganic content of the cordierite-forming mixture; and
   a mullite raw material in an amount of 0% to about 35% by weight of the total inorganic content of the cordierite-forming mixture,
   wherein the cordierite-forming mixture satisfies the following relationship:

$$W_M(0.477-0.0095D_{50,M})+W_S(0.469-0.019D_{50,S})+W_P(0.721-0.075D_{50,P})+0.055(W_A)(D_{50,A}) \leq 13,$$

wherein $W_M$ is a percentage by weight of mullite raw material, $W_S$ is a percentage by weight of $Al_2SiO_5$ raw material, WP is a percentage by weight of the platy aluminum silicate raw material, and $W_A$ is a percentage by weight of the alumina source material, $D_{50,M}$ is a median particle diameter of the mullite raw material in microns, $D_{50,S}$ is a median particle diameter of the $Al_2SiO_5$ raw material in microns, $D_{50,P}$ is a median particle diameter of the platy aluminum silicate raw material in microns, and $D_{50,A}$ is a median particle diameter of the alumina source material in microns.

8. The method of claim 7, wherein:

$$W_M(0.477-0.0095D_{50,M})+W_S(0.469-0.019D_{50,S})+W_P(0.721-0.075D_{50,P})+0.055(W_A)(D_{50,A}) \leq 12.6$$

9. The method of claim 1, wherein the cordierite-forming mixture comprises talc in an amount of about 0% to about 45% by weight of the total inorganic content of the cordierite-forming mixture.

10. The method of claim 9, wherein the cordierite-forming mixture is substantially free of talc.

11. The method of claim 1, wherein the porous ceramic article comprises a porosity of at least about 35%.

12. The method of claim 1, wherein the porous ceramic article comprises cordierite in an amount greater than about 85% by weight of a total of all crystalline phases within the porous ceramic article.

13. The method of claim 1, wherein the porous ceramic article comprises a sum of spinel, sapphirine, mullite, and corundum in an amount of 0% to about 10% by weight of a total of all crystalline phases within the porous ceramic article.

14. The method of claim 13, wherein the porous ceramic article is substantially free of cristobalite.

15. The method of claim 1, wherein the porous ceramic article comprises a composition that satisfies the following relationships:

(wt % MgO+wt % $Al_2O_3$+wt % $SiO_2$)$\geq$90, $10 \leq 100[\text{wt \% MgO}/(\text{wt \% MgO}+\text{wt \% } Al_2O_3+\text{wt \% } SiO_2)] \leq 16,$ $31 \leq 100[\text{wt \% } Al_2O_3/(\text{wt \% MgO}+\text{wt \% } Al_2O_3+\text{wt \% } SiO_2)] \leq 40,$ and $47 < 100[\text{wt \% } SiO_2/(\text{wt \% MgO}+\text{wt \% } Al_2O_3+\text{wt \% } SiO_2)] \leq 56.$ 16. The method of claim 1, wherein forming the cordierite-forming mixture to form the green body comprises extruding the cordierite-forming mixture to form a green body that comprises a network of walls that extend in an axial direction about a longitudinal axis from an inlet end to an outlet end of the green body.

17. The method of claim 1, wherein the porous ceramic article comprises an an $E_{800°C}/E_{25°C}$ ratio of at least about 1.00.

18. A method of making a porous ceramic article comprising cordierite, the method comprising:
   mixing a plurality of materials to form a cordierite-forming mixture, wherein the cordierite-forming mixture comprises:
   (i) a chlorite raw material in an amount of about 5% to about 60% by weight of a total inorganic content of the cordierite-forming mixture,
   (ii) a silica source material,
   (iii) an alumina source material in an amount of 0% to about 40% by weight of the total inorganic content of the cordierite-forming mixture;
   (iv) a platy aluminum silicate raw material in an amount of 0% to about 30% by weight of the total inorganic content of the cordierite-forming mixture;
   (v) an $Al_2SiO_5$ raw material in an amount of 0% to about 45% by weight of the total inorganic content of the cordierite-forming mixture;
   (vi) a mullite raw material in an amount of 0% to about 35% by weight of the total inorganic content of the cordierite-forming mixture,
   wherein the cordierite-forming mixture satisfies the following relationship:

$$W_M(0.477-0.0095D_{50,M})+W_S(0.469-0.019D_{50,S})+W_P(0.721-0.075D_{50,P})+0.055(W_A)(D_{50,A}) \leq 13,$$

wherein $W_M$ is a percentage by weight of mullite raw material, $W_S$ is a percentage by weight of $Al_2SiO_5$ raw material, $W_P$ is a percentage by weight of the platy aluminum silicate raw material, and $W_A$ is a percentage by weight of the alumina source material, $D_{50,M}$ is a median particle diameter of the mullite raw material in microns, $D_{50,S}$ is a median particle diameter of the $Al_2SiO_5$ raw material in microns, $D_{50,P}$ is a median particle diameter of the platy aluminum silicate raw material in microns, and $D_{50,A}$ is a median particle diameter of the alumina source material in microns;
   forming the cordierite-forming mixture into a green body; and
   firing the green body to form the porous ceramic article comprising cordierite.

19. A method of making a porous ceramic article comprising cordierite, the method comprising:
   mixing a plurality of materials to form a cordierite-forming mixture, wherein the cordierite-forming mixture comprises:
   (iv) a chlorite raw material in an amount of about 5% to about 60% by weight of a total inorganic content of the cordierite-forming mixture,
   (v) a silica source material, and
   (vi) an aluminum-containing source material, wherein the aluminum-containing source material comprises a platy aluminum silicate raw material in an amount of 0% to about 30% by weight of the total inorganic content of the cordierite-forming mixture;
   forming the cordierite-forming mixture into a green body; and
   firing the green body to form the porous ceramic article comprising cordierite, wherein the composition of the porous ceramic article further satisfies the following relationship:

$A+AE+RE<0.5,$ where A is a sum of weight percentages of alkali metal oxides, AE is a sum of weight percentages of alkaline earth metal oxides excluding MgO, and RE is a sum of weight percentages of rare earth metal oxides;

wherein the porous ceramic article comprises an E8000c/E250c ratio of at least about 1.00.

20. A method of making a porous ceramic article comprising cordierite, the method comprising:
mixing a plurality of materials to form a cordierite-forming mixture, wherein the cordierite-forming mixture comprises:
(vii) a chlorite raw material in an amount of about 5% to about 60% by weight of a total inorganic content of the cordierite-forming mixture,
(viii) a silica source material, and
(ix) an aluminum-containing source material, wherein the aluminum-containing source material comprises a platy aluminum silicate raw material in an amount of 0% to about 30% by weight of the total inorganic content of the cordierite-forming mixture;
forming the cordierite-forming mixture into a green body; and
firing the green body to form the porous ceramic article comprising cordierite,
wherein the composition of the porous ceramic article further satisfies the following relationship:

$$A+AE+RE<0.5,$$

where A is a sum of weight percentages of alkali metal oxides, AE is a sum of weight percentages of alkaline earth metal oxides excluding MgO, and RE is a sum of weight percentages of rare earth metal oxides;

wherein the aluminum-containing source material comprises:
an alumina source material in an amount of 0% to about 40% by weight of the total inorganic content of the cordierite-forming mixture;
an Al2SiO5 raw material in an amount of 0% to about 45% by weight of the total inorganic content of the cordierite-forming mixture; and
a mullite raw material in an amount of 0% to about 35% by weight of the total inorganic content of the cordierite-forming mixture,
wherein the cordierite-forming mixture satisfies the following relationship:

$$W_M(0.477-0.0095D_{50,M})+W_S(0.469-0.019D_{50,S})+W_P(0.721-0.075D_{50,P})+0.055(W_A)(D_{50,A}) \leq 13,$$

wherein $W_M$ is a percentage by weight of mullite raw material, $W_S$ is a percentage by weight of $Al_2SiO_5$ raw material, $W_P$ is a percentage by weight of the platy aluminum silicate raw material, and $W_A$ is a percentage by weight of the alumina source material, $D_{50,M}$ is a median particle diameter of the mullite raw material in microns, $D_{50,S}$ is a median particle diameter of the $Al_2SiO_5$ raw material in microns, $D_{50,P}$ is a median particle diameter of the platy aluminum silicate raw material in microns, and $D_{50,A}$ is a median particle diameter of the alumina source material in microns.

21. The method of claim 20, wherein:

$$W_M(0.477-0.0095D_{50,M})+W_S(0.469-0.019D_{50,S})+W_P(0.721-0.075D_{50,P})+0.055(W_A)(D_{50,A}) \leq 12.6$$

* * * * *

UNITED STATES PATENT AND TRADEMARK OFFICE
CERTIFICATE OF CORRECTION

PATENT NO. : 11,535,563 B2
APPLICATION NO. : 16/765691
DATED : December 27, 2022
INVENTOR(S) : Gregory Albert Merkel It is certified that error appears in the above-identified patent and that said Letters Patent is hereby corrected as shown below:

On the Title Page

On the page 2, in Column 2, under "Other Publications", Line 4, delete "PCT/US2018/063301" and insert -- PCT/US2018/063301; --.

In the Claims

In Column 22, Line 30, in Claim 1, before "a" insert -- (i) --.

In Column 23, Line 21, in Claim 7, delete "WP" and insert -- $W_P$ --.

In Column 23, Line 24, in Claim 7, delete "$D_{50,s}$" and insert -- $D_{50,S}$ --.

In Column 23, Line 32, in Claim 8, delete "12.6" and insert -- 12.6. --.

In Column 24, Line 5, in Claim 17, delete "an an" and insert -- an --.

In Column 26, Line 6, in Claim 20, delete "Al2SiO5" and insert -- $Al_2SiO_5$ --.

Signed and Sealed this
First Day of August, 2023

Katherine Kelly Vidal
*Director of the United States Patent and Trademark Office*